United States Patent
Yishay

(10) Patent No.: US 11,303,736 B2
(45) Date of Patent: *Apr. 12, 2022

(54) SYSTEM AND METHOD FOR IDENTIFYING DEVICES BEHIND NETWORK ADDRESS TRANSLATORS BASED ON TCP TIMESTAMPS

(71) Applicant: Verint Systems LTD., Herzliya Pituach (IL)

(72) Inventor: Yitshak Yishay, Revava (IL)

(73) Assignee: COGNYTE TECHNOLOGIES ISRAEL LTD, Pituach (IL)

( * ) Notice: Subject to any disclaimer, the term of this patent is extended or adjusted under 35 U.S.C. 154(b) by 17 days.

This patent is subject to a terminal disclaimer.

(21) Appl. No.: 16/927,036

(22) Filed: Jul. 13, 2020

(65) Prior Publication Data

US 2020/0344330 A1 Oct. 29, 2020

Related U.S. Application Data

(63) Continuation of application No. 16/262,001, filed on Jan. 30, 2019, now Pat. No. 10,715,641.

(30) Foreign Application Priority Data

Jan. 31, 2018 (IL) .......................................... 257284

(51) Int. Cl.
*H04L 29/06* (2006.01)
*H04L 29/12* (2006.01)
(Continued)

(52) U.S. Cl.
CPC .......... *H04L 69/163* (2013.01); *H04L 43/106* (2013.01); *H04L 43/16* (2013.01);
(Continued)

(58) Field of Classification Search
CPC ..... H04L 69/163; H04L 69/28; H04L 43/106; H04L 43/16; H04L 43/14; H04L 61/2571
See application file for complete search history.

(56) References Cited

U.S. PATENT DOCUMENTS

| 7,088,677 B1 | 8/2006 | Burst |
| 7,882,217 B2 | 2/2011 | Katzir |

(Continued)

OTHER PUBLICATIONS

Barsamian, A., et al., "Identifying Network Users Using Flow-Based Behavioral Fingerprinting," FlowTraq, 2013, 23 pages.

(Continued)

*Primary Examiner* — Azizul Choudhury
(74) *Attorney, Agent, or Firm* — Isus Intellectual Property PLLC; Anthony Jason Mirabito

(57) ABSTRACT

Methods and systems for monitoring activity on a local area networks (LAN). In particular, embodiments described herein provide systems and methods for associating packets with the devices from which they were communicated, despite the obfuscatory behavior of any network address translators (NAT). A processor first receives packets that were collectively communicated, by a plurality of devices, via a NAT-serviced LAN. The processor aggregates the packets into multiple packet aggregations on a per device basis. Fields that are contained in the respective packet headers of the packets are used. The packet aggregations may be grouped. The embodiments use unencrypted lower-level information (including, for example, IPIDs and domain names), such that aggregation and grouping may be successfully performed even if information in the application layer is encrypted.

20 Claims, 6 Drawing Sheets

(51) Int. Cl.
| | |
|---|---|
| H04L 12/26 | (2006.01) |
| H04L 69/163 | (2022.01) |
| H04L 61/256 | (2022.01) |
| H04L 43/16 | (2022.01) |
| H04L 69/28 | (2022.01) |
| H04L 43/106 | (2022.01) |
| H04L 43/0876 | (2022.01) |
| H04L 43/00 | (2022.01) |

(52) U.S. Cl.
CPC .......... H04L 61/2571 (2013.01); H04L 69/28 (2013.01); *H04L 43/0876* (2013.01); *H04L 43/14* (2013.01)

(56) References Cited

U.S. PATENT DOCUMENTS

| | | | |
|---|---|---|---|
| 8,037,167 | B1 | 10/2011 | Bellovin |
| 8,665,728 | B2 | 3/2014 | Altman |
| 10,715,641 | B2 * | 7/2020 | Yishay .................... H04L 69/28 |
| 2010/0161795 | A1 | 6/2010 | Derridder et al. |
| 2015/0006755 | A1 | 1/2015 | Turlington et al. |

OTHER PUBLICATIONS

Bellovin, S., "A Technique for Counting NATted Hosts," Proceedings of the 2$^{nd}$ ACM SIGCOMM Workshop in Internet measurement, 2002, pp. 267-272.

Bokde, D.K., et al., "Role of Matrix Factorization Model in Collaborative Filtering Algorithm: A Survey," International Journal of Advance Foundation and Research in Computer (IJAFRC), vol. 1, Issue 6, 2014, 6 pages.

Bursztein, E., "Time has something to tell us about Network Address Translation," Jul. 2007, 6 pages.

Chen, N., et al., "Mobile App Tagging," WSDM '16, San Francisco, CA, Feb. 22-25, 2016, pp. 63-72.

Chen, Y-C, et al., "OS Fingerprinting and Tethering Detection in Mobile Networks," Proceedings of the 2014 Conference on Internet Measurement, 2014, pp. 173-179.

Cohen, M.I., "Source attribution for network address translated forensic captures," Digital Investigation, vol. 5, 2009, pp. 38-145.

Gokcen, Y., "A Preliminary Study for Identifying NAT Traffic Using Machine Learning," Thesis, Dalhousie University, Halifax, Nova Scotia, Canada, 2014, 80 pages.

Gokcen, Y., "Can we identify, NAT behavior by analyzing Traffic Flows," IEEE Security and Privacy Workshops, 2014, pp. 132-139.

Huang, D-J, et al., "Clock Skew Based Client Device Identification in Cloud Environments," 26$^{th}$ IEEE International Conference on Advanced Information Networking and Applications, 2012, pp. 526-533.

Kohno, T., "Remote Physical Device Fingerprinting," IEEE Transactions on Dependable and Secure Computing, vol. 2, No. 2, 2005, pp. 93-108.

Malmi, E., et al., "You Are What Apps You Use: Demographic Prediction Based on User's Apps," http://www.idigitaltimes.com/what-do-your-apps-say-about-you-new-app-iphone-here-tell-you-410883, 2016, 4 pages.

McHugh, J., et al., "Passive Network Forensics: Behavioural Classification of Network Hosts Based on Connection Patterns," ACM SIGOPS Operating Systems Review, vol. 42, Issue 3, 2008, pp. 99-111.

Mongkolluksamee, S., et al., Enhancing the Performance of Mobile Traffic Identification with Communication Patterns, Conference Paper, 2015, 11 pages.

NetOptics, Inc., Product Sheet, 1996, 1 page.

Sandvine Inc., "Policy Control for Connected and Tethered Devices," 2015, 11 pages.

Zakin, O., et al., "Identifying Computers Hidden Behind a NAT using Machine Learning Techniques," 6$^{th}$ European Conference on Information Warfare and Security (ECIW), Shrivenham, United Kingdom, Jul. 2007, 2 pages.

* cited by examiner

SYSTEM AND METHOD FOR IDENTIFYING DEVICES BEHIND NETWORK ADDRESS TRANSLATORS BASED ON TCP TIMESTAMPS

This application is a Continuation of application Ser. No. 16/262,001, filed Jan. 30, 2019, granted as U.S. patent Ser. No. 10/715,641, which claims priority to Israel Patent Application No. 257284, filed Jan. 31, 2018, which applications are hereby incorporated by this reference in their entireties as if fully set forth herein.

FIELD OF THE DISCLOSURE

The present disclosure relates generally to communication over computer networks.

BACKGROUND OF THE DISCLOSURE

US Patent Application Publication 2017/0222922, whose disclosure is incorporated herein by reference, describes an apparatus for monitoring a plurality of devices that use a plurality of networks. The apparatus includes a network interface and a processor. The processor is configured to receive, via the network interface, a plurality of packets that were collectively communicated, from the devices, via all of the networks, to aggregate the packets, using at least one field that is included in respective packet headers of the packets, into a plurality of packet aggregations, such that all of the packets in each one of the packet aggregations were collectively communicated from no more than one of the devices, to group the packet aggregations into a plurality of groups, such that there is a one-to-one correspondence between the groups and the devices, in that all of the packets in each of the groups were collectively communicated from a different respective one of the devices, and to generate an output in response thereto.

U.S. Pat. No. 7,882,217 describes a computer-implemented method for communication analysis. The method includes monitoring communication sessions, which are conducted by entities in a communication network. Identifiers that identify the entities are extracted from the monitored sessions. The identifiers extracted from the sessions are grouped in respective identity clusters, each identity cluster identifying a respective entity. A subset of the identity clusters, which includes identifiers that identify a target entity, is merged to form a merged identity cluster that identifies the target entity. An activity of the target entity in the communication network is tracked using the merged identity cluster.

U.S. Pat. No. 8,665,728 describes methods and systems for identifying network users who communicate with the network (e.g., the Internet) via a given network connection. The disclosed techniques analyze traffic that flows in the network to determine, for example, whether the given network connection serves a single individual or multiple individuals, a single computer or multiple computers. A Profiling System (PS) acquires copies of data traffic that flow through network connections that connect computers to the WAN. The PS analyzes the acquired data, attempting to identify individuals who login to servers.

Bellovin, Steven M. "A technique for counting NATted hosts," Proceedings of the 2nd ACM SIGCOMM Workshop on Internet measurment, ACM, 2002, describes a technique for detecting NATs and counting the number of active hosts behind them. The technique is based on the observation that on many operating systems, the IP header's ID field is a simple counter. By suitable processing of trace data, packets emanating from individual machines can be isolated, and the number of machines determined.

Bursztein, Elie, "Time has something to tell us about network address translation," Proc. of NordSec. 2007, describes a new technique to count the number of hosts behind a NAT. This technique is based on the TCP timestamp, and works with Linux and BSD systems.

Gokcen, Yasemin, and Vahid Aghaei Foroushani, "Can we identify NAT behavior by analyzing Traffic Flows?" Security and Privacy Workshops (SPW), 2014, IEEE, 2014, describes a machine learning (ML) approach to identifying malicious behaviors using only network flows. The proposed approach is evaluated on different traffic data sets against passive fingerprinting approaches.

Gokcen, Yasemin, "A preliminary study for identifying NAT traffic using machine learning," (2014), describes identifying the presence of NAT devices and (if possible) predicting the number of users behind those NAT devices. Gokcen utilizes different approaches and evaluates the performance of these approaches under different network environments represented by the availability of different data fields. To achieve this, Gokcen proposes a machine learning (ML) based approach to detect NAT devices.

SUMMARY OF THE DISCLOSURE

There is provided, in accordance with some embodiments of the present disclosure, a system that includes a network interface and a processor. The processor is configured to receive, via the network interface, a plurality of packets that belong to respective Transmission Control Protocol (TCP) connections associated with an unknown number of respective devices. The processor is further configured to identify respective TCP timestamps of the packets, and respective receipt times at which the packets were received. The processor is further configured to partition the TCP connections into a plurality of TCP-connection subsets, by iteratively selecting one of the TCP connections that does not yet belong to any of the TCP-connection subsets, and iteratively selecting one of the TCP-connection subsets, tentatively adding the selected one of the TCP connections to the selected one of the TCP-connection subsets, such as to form a tentatively-augmented TCP-connection subset to which a subset of the packets belong, calculating a deviation by which a relationship between (i) the respective TCP timestamps of the subset of the packets, and (ii) the respective receipt times at which the subset of the packets were received, deviates from a linear relationship, calculating a threshold deviation for the tentatively-augmented TCP-connection subset, and, provided that the deviation is less than the threshold deviation, adding the selected one of the TCP connections to the selected one of the TCP-connection subsets. The processor is further configured to, in response to the partitioning, generate an output that indicates that each one of the TCP-connection subsets is associated with a single one of the devices.

In some embodiments, the processor is further configured to represent the packets by respective two-dimensional coordinates, each of which includes (i) the receipt time of a respective one of the packets, and (ii) the TCP timestamp of the respective one of the packets, the deviation is a mean squared error (MSE) that would result from fitting a line to those of the two-dimensional coordinates that represent the subset of the packets, and the threshold deviation is a threshold MSE.

In some embodiments,
the MSE is a multiple-TCP-connection MSE,
the line is a multiple-TCP-connection line,
the processor is further configured to calculate, for the TCP connections, respective single-TCP-connection MSEs, each of which would result from fitting a respective single-TCP-connection line to those of the two-dimensional coordinates that represent those of the packets belonging to a respective one of the TCP connections, and
the processor is configured to calculate the threshold MSE as a function of those of the single-TCP-connection MSEs that belong to the tentatively-augmented TCP-connection subset.

In some embodiments, the processor is configured to calculate the threshold MSE by:
calculating an average of those of the single-TCP-connection MSEs that belong to the tentatively-augmented TCP-connection subset, and
multiplying the average by a predetermined factor.

In some embodiments,
the average is a weighted average, and
the processor is further configured to, prior to calculating the weighted average, weight each of those of the single-TCP-connection MSEs that belong to the tentatively-augmented TCP-connection subset by a number of the packets that belong to the TCP connection to which the single-TCP-connection MSE corresponds.

In some embodiments, the processor is further configured to, in response to the output, associate first information contained in a first one of the TCP connections with second information contained in a second one of the TCP connections that belongs to the same TCP-connection subset as the first one of the TCP connections.

There is further provided, in accordance with some embodiments of the present disclosure, a system that includes a network interface and a processor. The processor is configured to receive, via the network interface, a plurality of packets that belong to respective Transmission Control Protocol (TCP) connections associated with an unknown number of respective devices. The processor is further configured to identify respective TCP timestamps of the packets, and respective receipt times at which the packets were received. The processor is further configured to partition the TCP connections into a plurality of TCP-connection subsets. The processor is further configured to, for each of the TCP-connection subsets, calculate a deviation by which a relationship between (i) the respective TCP timestamps of those of the packets belonging to the TCP-connection subset, and (ii) the respective receipt times at which those of the packets belonging to the TCP-connection subset were received, deviates from a linear relationship, calculate a threshold deviation, and ascertain that the deviation is less than the threshold deviation. The processor is further configured to, in response to the ascertaining, generate an output that indicates that each one of the TCP-connection subsets is associated with a single one of the devices.

There is further provided, in accordance with some embodiments of the present disclosure, a method that includes receiving a plurality of packets that belong to respective Transmission Control Protocol (TCP) connections associated with an unknown number of respective devices. The method further includes identifying respective TCP timestamps of the packets, and respective receipt times at which the packets were received. The method further includes partitioning the TCP connections into a plurality of TCP-connection subsets, by iteratively selecting one of the TCP connections that does not yet belong to any of the TCP-connection subsets, and iteratively selecting one of the TCP-connection subsets, tentatively adding the selected one of the TCP connections to the selected one of the TCP-connection subsets, such as to form a tentatively-augmented TCP-connection subset to which a subset of the packets belong, calculating a deviation by which a relationship between (i) the respective TCP timestamps of the subset of the packets, and (ii) the respective receipt times at which the subset of the packets were received, deviates from a linear relationship, calculating a threshold deviation for the tentatively-augmented TCP-connection subset, and, provided that the deviation is less than the threshold deviation, adding the selected one of the TCP connections to the selected one of the TCP-connection subsets. The method further includes, in response to the partitioning, generating an output that indicates that each one of the TCP-connection subsets is associated with a single one of the devices.

There is further provided, in accordance with some embodiments of the present disclosure, a method that includes receiving a plurality of packets that belong to respective Transmission Control Protocol (TCP) connections associated with an unknown number of respective devices. The method further includes identifying respective TCP timestamps of the packets, and respective receipt times at which the packets were received. The method further includes partitioning the TCP connections into a plurality of TCP-connection subsets. The method further includes, for each of the TCP-connection subsets, calculating a deviation by which a relationship between (i) the respective TCP timestamps of those of the packets belonging to the TCP-connection subset, and (ii) the respective receipt times at which those of the packets belonging to the TCP-connection subset were received, deviates from a linear relationship, calculating a threshold deviation, and ascertaining that the deviation is less than the threshold deviation. The method further includes, in response to the ascertaining, generating an output that indicates that each one of the TCP-connection subsets is associated with a single one of the devices.

There is further provided, in accordance with some embodiments of the present disclosure, a computer software product including a tangible non-transitory computer-readable medium in which program instructions are stored. The instructions, when read by a processor, cause the processor to receive a plurality of packets that belong to respective Transmission Control Protocol (TCP) connections associated with an unknown number of respective devices. The instructions further cause the processor to identify respective TCP timestamps of the packets, and respective receipt times at which the packets were received. The instructions further cause the processor to partition the TCP connections into a plurality of TCP-connection subsets, by iteratively selecting one of the TCP connections that does not yet belong to any of the TCP-connection subsets, and iteratively selecting one of the TCP-connection subsets, tentatively adding the selected one of the TCP connections to the selected one of the TCP-connection subsets, such as to form a tentatively-augmented TCP-connection subset to which a subset of the packets belong, calculating a deviation by which a relationship between (i) the respective TCP timestamps of the subset of the packets, and (ii) the respective receipt times at which the subset of the packets were received, deviates from a linear relationship, calculating a threshold deviation for the tentatively-augmented TCP-connection subset, and, provided that the deviation is less than the threshold deviation, adding the selected one of the TCP connections to the selected one of the TCP-connection subsets. The instructions further cause the processor to, in response to the partitioning, generate an output that indicates that each one of the TCP-connection subsets is associated with a single one of the devices.

There is further provided, in accordance with some embodiments of the present disclosure, a computer software product including a tangible non-transitory computer-readable medium in which program instructions are stored. The instructions, when read by a processor, cause the processor to receive a plurality of packets that belong to respective Transmission Control Protocol (TCP) connections associated with an unknown number of respective devices. The instructions further cause the processor to identify respective TCP timestamps of the packets, and respective receipt times at which the packets were received. The instructions further cause the processor to partition the TCP connections into a plurality of TCP-connection subsets. The instructions further cause the processor to, for each of the TCP-connection subsets, calculate a deviation by which a relationship between (i) the respective TCP timestamps of those of the packets belonging to the TCP-connection subset, and (ii) the respective receipt times at which those of the packets belonging to the TCP-connection subset were received, deviates from a linear relationship, calculate a threshold deviation, and ascertain that the deviation is less than the threshold deviation. The instructions further cause the processor to, in response to the ascertaining, generate an output that indicates that each one of the TCP-connection subsets is associated with a single one of the devices.

The present disclosure will be more fully understood from the following detailed description of embodiments thereof, taken together with the drawings, in which:

DETAILED DESCRIPTION OF EMBODIMENTS

Overview

Figure 1:
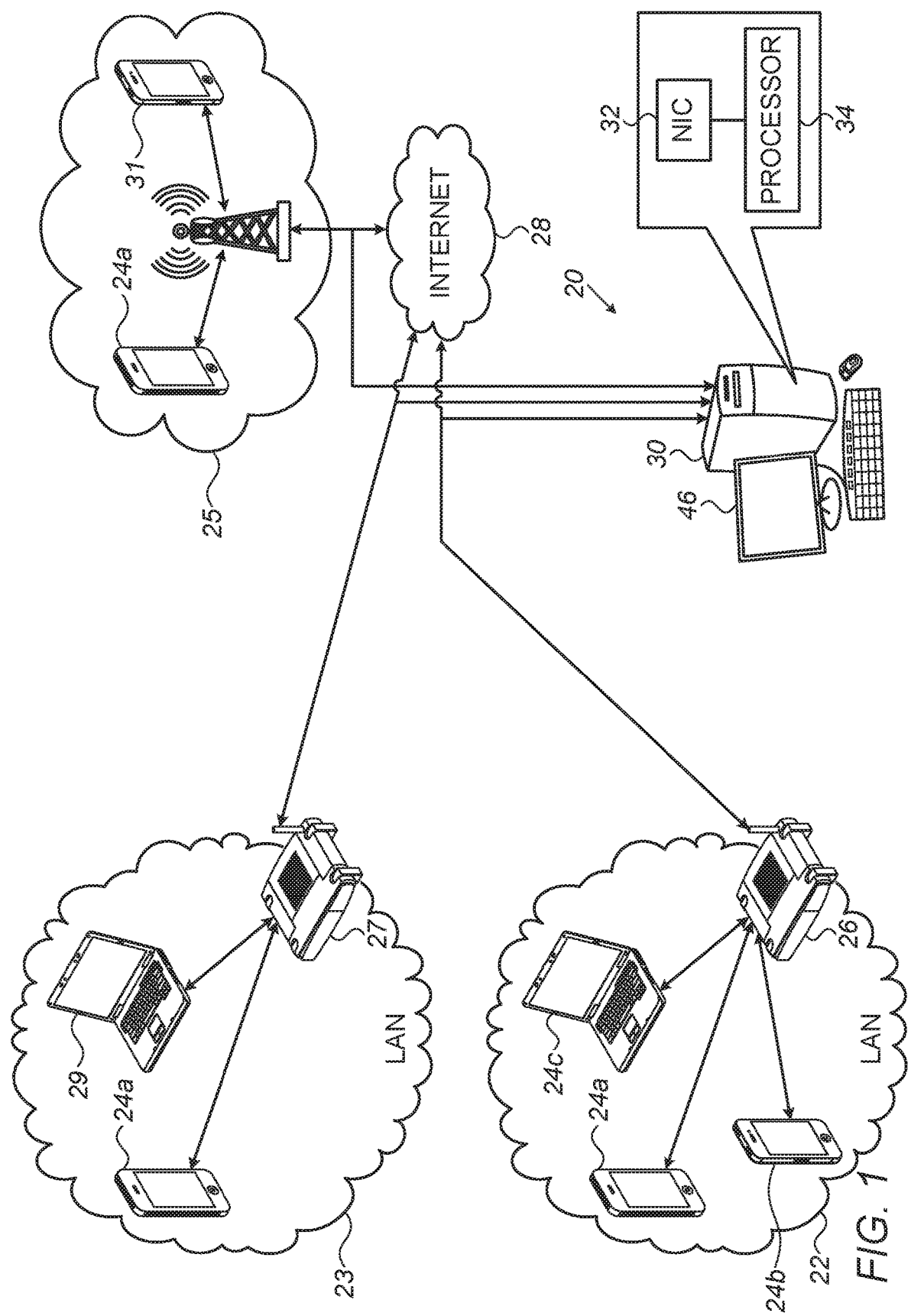
FIG. 1 is a schematic illustration of a system for identifying devices behind a NAT, in accordance with some embodiments described herein.

A network address translator (NAT) maps one internet protocol (IP) space to another IP space, by modifying network address information contained in packet headers as they pass through a routing device. For example, a NAT may map multiple private hosts to one publicly-exposed IP address, such that all traffic emanating from a particular local area network (LAN) may be appear to originate from a single host.

The obfuscatory behavior of NATs poses a challenge to entities that wish to monitor communication exchanged with particular devices, or to discover which devices belong to a particular LAN. This challenge is amplified by the fact that a particular device may use multiple networks (and, perhaps, multiple NATs) at different times.

Embodiments described herein address this challenge, thus allowing the activity on LANs to be effectively monitored. In particular, embodiments described herein provide systems and methods for associating packets with the devices from which they were communicated, despite the obfuscatory behavior of any NATs. Embodiments described herein may be applied to lawful monitoring of communication (e.g., by the Police or Homeland Security), traffic management, network management, parental control, quality-of-service monitoring, or any other relevant application.

In embodiments described herein, a processor first receives (e.g., via a network tap) packets that were collectively communicated, by a plurality of devices, via a NAT-serviced LAN. As a first step in associating each of these packets with the device from which it was communicated, the processor aggregates the packets into multiple packet aggregations, each packet aggregation including packets that were collectively communicated from no more than one device. To perform the aggregation, fields that are contained in the respective packet headers of the packets, such as a transmission control protocol (TCP) 5-tuple, an internet protocol identification (IPID), or a TCP timestamp, are used. In particular, the processor may identify the TCP connection to which any given packet belongs, based on the 5-tuple of the packet. In the event that multiple TCP connections are identified, the processor may decide which of the TCP connections to aggregate together, i.e., which of the TCP connections to associate with a single common device, based on the TCP timestamps of the packets.

For example, the processor may represent each received packet as a two-dimensional data point $(t_i, s_i)$, where $t_i$ is the time at which the packet was received by the processor or by the network tap, and $s_i$ is the TCP timestamp of the packet. Given this representation, to check whether to aggregate a given plurality of TCP connections with one another, the processor may compute the mean squared error (MSE) that would result from fitting a line through all of the data points belonging to the plurality of TCP connections. If the MSE is less than a particular threshold, the processor may aggregate the TCP connections; otherwise, the processor may assume that the TCP connections are associated with different respective devices. This technique capitalizes on the fact that (i) for any given device (at least over short time intervals), the TCP timestamp tends to increase approximately linearly with the clock time of the device, and (ii) assuming relatively little jitter (i.e., variance of latency) on the network, the receipt time also increases approximately linearly with the clock time of the device.

Typically, the processor sets the error threshold in accordance with the degree to which the individual TCP connections indicate a linear relationship between the TCP timestamp and the packet receipt time. In other words, the processor, by analyzing the individual TCP connections, assesses the degree to which the packet receipt time predicts the TCP timestamp (assuming a linear relationship between these two variables), and then sets the error threshold responsively thereto. In particular, in response to a stronger linear relationship (e.g., in cases in which the jitter in the network is relatively small), the processor sets a smaller threshold; conversely, in response to a weaker relationship (e.g., in cases in which the jitter is relatively large), the processor sets a larger threshold.

For example, when evaluating whether to aggregate two given TCP connections, the processor may first compute the average of (i) the MSE that would result from fitting a line to the first TCP connection, and (ii) the MSE that would result from fitting a line to the second TCP connection. The processor may then set the threshold as a suitable multiple of this average. Subsequently, the processor may compare the combined MSE—i.e., the MSE that would result from fitting single line to both of the TCP connections—to this threshold. If the combined MSE is less than the threshold, the TCP connections are aggregated; otherwise, the TCP connections are not aggregated.

Over relatively short periods of time, the above-described aggregation of TCP connections (which may equivalently be described as an aggregation of packets) may yield a one-to-one correspondence between packet aggregations and devices, in that each device may have exactly one corresponding packet aggregation. Over longer periods of time, however, the fields used for aggregation are likely to be reset, and therefore, a device may accrue more than one corresponding packet aggregation. Hence, the present disclosure also provides techniques for grouping the packet aggregations, such that each device has exactly one corresponding group of packet aggregations, even over long periods of time. Such grouping may be performed by one or both of the following techniques:

(i) A uniquely-assigned device identifier, such as an Internet cookie, may be identified in at least one of the packets in a particular packet aggregation. Subsequently, using the device identifier, the packet aggregation may be associated with the device from which the packets in the packet aggregation were communicated. (Even if only one packet in the packet aggregation includes the identifier, the entire packet aggregation may be associated with the device, since it is known that the entire packet aggregation was communicated from a single device.) In this manner, multiple packet aggregations may be grouped together, in association with a single device, based on each of these packet aggregations including the uniquely-assigned device identifier of the device.

(ii) Device-usage characteristics exhibited by the packet aggregation may be used to group the packet aggregation together with other packet aggregations that originated from the same device. For example, if two particular packet aggregations tend to access similar network resources, as evidenced by a similar pattern of domain name system (DNS) queries or Internet Protocol (IP) addresses that appear in the packet aggregations, it may be ascertained that the two packet aggregations originated from the same device. In this manner, the number of devices behind a particular NAT, in addition to the usage characteristics of the devices, may be ascertained, even if no device identifiers are identified in the packets.

Typically, the processor monitors multiple networks, such as multiple LANs (each of which may be serviced by a respective NAT), and/or cellular networks. Advantageously, the above-described grouping techniques may be effective even if a particular device uses more than one of these networks (i.e., the techniques may be used to group together packet aggregations across a plurality of these networks), since the device identifiers and device-usage characteristics used for the grouping typically do not change as a device moves between different networks.

An advantage of embodiments described herein is that the application layer of communication, which is often encrypted, is not exclusively relied upon for aggregating or grouping the packets. Rather, embodiments described herein may use unencrypted lower-level information (including, for example, IPIDs and domain names), such that aggregation and grouping may be successfully performed even if information in the application layer is encrypted.

System Description

Reference is initially made to FIG. 1, which is a schematic illustration of a system 20 for identifying devices behind a NAT, in accordance with some embodiments described herein.

FIG. 1 depicts a plurality of devices 24a, 24b, and 24c using a LAN 22. A NAT 26 performs network address translation as described above, such that the headers of all packets communicated from NAT 26 to the Internet 28 share a common source IP address. Similarly, all packets communicated from the Internet to the NAT share a common destination IP Address.

Devices 24a-c do not necessarily remain in LAN 22; rather, any one of the devices may also use any other network at any given time. For example, FIG. 1 shows device 24a using, at a different time, a second LAN 23, which is shared by another device 29 and is serviced by a second NAT 27. At yet another time, device 24a may use a cellular network 25, shared by another device 31. Thus, to identify communication from device 24a, at least two challenges must be addressed: (i) communication from device 24a must be differentiated from communication from other devices, and (ii) communication from device 24a must be identified regardless of which network is used by the device.

To address these challenges, a server 30 (e.g., belonging to a monitoring station) monitors communication exchanged between LAN 22, LAN 23, and cellular network 25 (as well as any number of other LANs or other types of networks), and the Internet. Specifically, exchanged packets—and in particular, packets communicated from the networks—are received en-route by one or more network taps, which pass the packets to a server 30. Server 30 receives the packets via a network interface, such as a NIC 32, and a processor 34, belonging to the server, then processes the packets, as described in detail hereinbelow, such as to identify the source of each packet.

In general, processor 34 may be embodied as a single processor, or a cooperatively networked or clustered set of processors. Processor 34 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Figure 2:
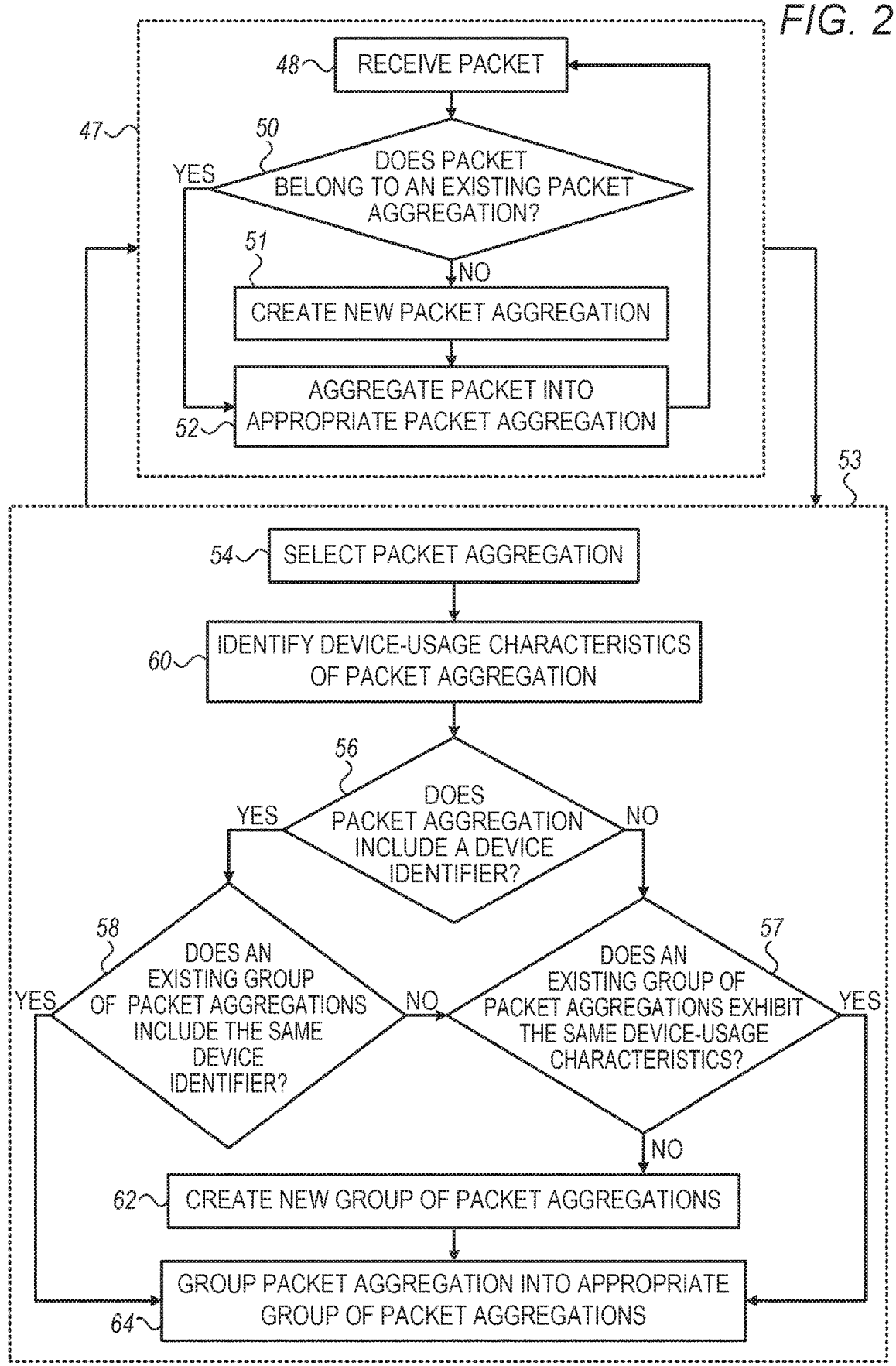
FIG. 2 is a flow diagram of a method performed by a processor to group packets with each other, in accordance with some embodiments described herein.
Figure 3:
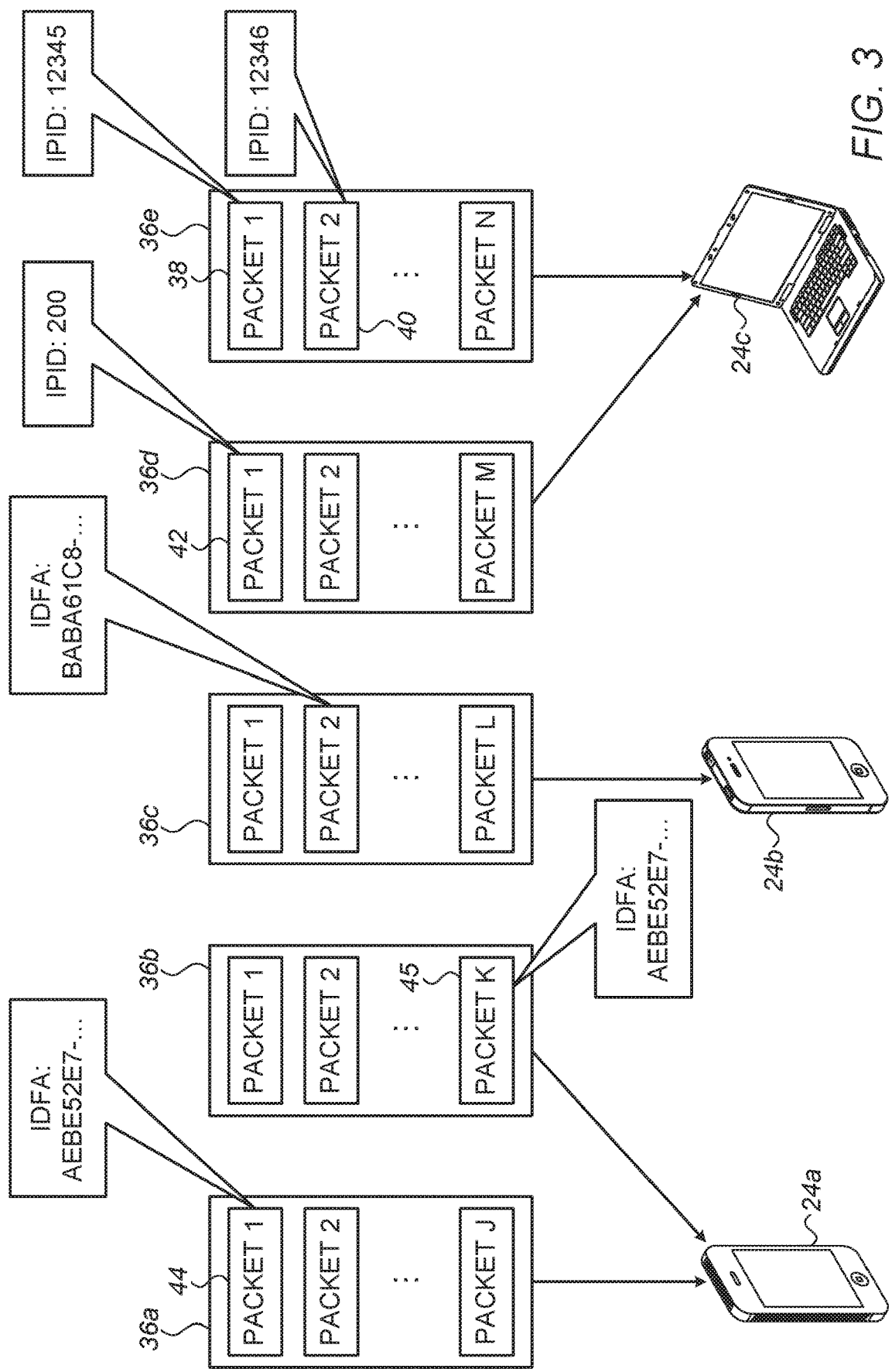
FIG. 3 is a schematic illustration showing the grouping of packets, in accordance with some embodiments described herein.

Reference is now made to FIG. 2, which is a flow diagram of a method performed by processor 34 to group packets with each other, and to FIG. 3, which is a schematic illustration showing the grouping of packets per the method of FIG. 2, in accordance with some embodiments described herein.

FIG. 2 shows two stages of operation. In a first stage 47, the processor receives the packets, and aggregates the packets into a plurality of packet aggregations, such that each packet aggregation includes packets that were collectively communicated from no more than one of the devices that uses LAN 22. Five such packet aggregations, numbered 36a through 36e, are shown in FIG. 3. Each of the packet aggregations may include any number of packets. By way of illustration, packet aggregations 36a-e are shown containing, respectively, J, K, L, M, and N packets, where J, K, L, M, and N are positive integers. Further details regarding first stage 47 are described below.

As described above in the Overview, over time, as the relevant fields (e.g., IPIDs) are reset, the number of packet aggregations will tend to exceed the number of devices by a greater and greater margin. Hence, in a second stage 53, the processor groups the packet aggregations together, such that no more than one group corresponds to a particular device. (In other words, the correspondence between groups and devices is one-to-one, such that all of the packets belonging to each group were collectively communicated from a single respective one of the devices.) The grouping of packet aggregations is illustrated in FIG. 3, which shows, for example, packet aggregations 36a and 36b being grouped together, in association with device 24a. Further details regarding second stage 53 are described below.

First stage 47 and second stage 53 may be performed in alternation, as indicated by the arrows that connect first stage 47 and second stage 53 in FIG. 2. For example, upon receiving a packet that includes a device identifier, the processor may add the packet to the appropriate packet aggregation (first stage 47), then use the device identifier to associate the packet aggregation with the appropriate device (second stage 53), and then continue to add incoming packets to the packet aggregation (first stage 47).

Alternatively, first stage 47 and second stage 53 may be performed simultaneously, e.g., on separate threads executed by the processor. For example, while aggregating incoming packets into various packet aggregations (first stage 47), the processor may identify device-usage characteristics in the packet aggregations, and/or group packet aggregations with each other (second stage 53).

First Stage 47

As described above, in first stage 47, the processor aggregates the packets that are received. To aggregate the packets, the processor uses at least one field that is included in respective packet headers of the packets. In some embodiments, this field is incremented by a device in a predictable manner as successive packets are communicated from the device, such that, upon observing a sequence of values of this field across multiple packets, it may be ascertained that the multiple packets were communicated from the same device. For example, each packet that is communicated from some versions of the Windows® operating system includes, in the packet's header, an internet protocol identification (IPID), which is incremented by one for each successive packet. The IPID may thus be used to aggregate the packets.

For example, with reference to both FIG. 2 and FIG. 3, the processor may first receive, at a packet-receiving step 48, a packet 38 that includes, in the packet's header, an IPID of 12345. The processor then checks, at a checking step 50, whether packet 38 belongs to an existing packet aggregation, by checking whether 12345 continues a sequence of IPIDs in any of the existing packet aggregations. If not, the processor creates a new packet aggregation 36e, at a packet-aggregation-creating step 51. The processor then, at an aggregating step 52, aggregates packet 38 into the new packet aggregation.

The processor may then receive, at packet-receiving step 48, a second packet (not explicitly identified in FIG. 3) that includes an IPID of 65789. At checking step 50, the processor identifies that 65789 is not in sequence with 12345, and therefore the processor aggregates the second received packet separately from packet 38.

The processor may then receive another packet 40 that includes an IPID of 12346. At checking step 50, the processor ascertains that packet 40 belongs to packet aggregation 36e, since the numerical sequentiality of the IPIDs of packets 38 and 40 indicates that packets 38 and 40 were likely communicated from the same device. (In FIG. 3, these two packets are depicted as having been communicated from device 24c.) The processor therefore aggregates packet 40 together with packet 38, at aggregating step 52.

It is noted that although the IPID is incremented by one for each successive packet, packets that do not leave the LAN are not received by server 30, and thus, there may be gaps in the sequentiality of the IPIDs. For example, after receiving a packet from device 24c that includes an IPID of 12345, the next packet from device 24c received by the processor may include an IPID of 12360. Hence, to identify that 12360 belongs to the same sequence of IPIDs as 12345, the processor may look at additional information contained in the packets, such as the respective TCP 5-tuples of the packets. If the two 5-tuples are identical, the processor ascertains that the two packets belong to the same TCP connection (and hence, emanate from the same device), notwithstanding the discontinuity in the IPID sequence.

In some cases, the processor may use domain-related information included in the packets to aggregate the packets. For example, device 24a may first establish a connection with a first domain, by transmitting an appropriate domain name system (DNS) query. Subsequently, device 24a may begin transmitting packets that are associated with the connection. Based on common domain-related information (e.g., a common IP address) in the packets, the processor identifies that these packets belong to a common connection, and therefore aggregates the packets with each other, as well as with the preceding DNS query.

In some operating systems (e.g., Windows 8 ®), the IPIDs of successive DNS queries are sequential, even though the IPIDs of successively transmitted packets are generally not sequential. Hence, for such operating systems, the processor may additionally aggregate together packets that are associated with multiple respective connections. For example, supposing that the aforementioned DNS query had an IPID of 100, device 24a may, subsequently, transmit a second DNS query having an IPID of 101. Based on the sequentiality of the IPIDs, the processor may aggregate the second DNS query, and subsequent packets associated with the second connection, with the previously-aggregated packets associated with the first connection.

In some cases, the "source port" field, which, in the Windows (R) operating system, is incremented for each successive connection, may be used to aggregate the packets. In other words, each received packet may be aggregated together with a previously-received packet, based on the two packets having respective source ports that are the same as one another, or that follow one another in sequence. Such a technique may work if (as is sometimes the case) the NAT preserves the source port field in packets that exit the LAN, or if no NAT is present.

For example, device 24a may first establish a connection with a first domain, and subsequently transmit packets associated with the connection and having a source port of 100. Based on the common source port, the processor may aggregate the packets together. Subsequently, device 24a may establish a connection with a second domain, and accordingly increment the source port field to 101 in associated packets. Based on the sequentiality of the source port, the processor may ascertain that these latter packets, which are associated with the second connection, should be aggregated with the previously-received packets, which are associated with the first connection.

Although, as noted above, each of the packet aggregations includes packets that were collectively communicated from no more than one device, there is not necessarily a one-to-one correspondence between packet aggregations and devices; rather, the correspondence may be many-to-one. For example, if device 24c is restarted, the sequence of IPIDs emanating from device 24c may be reset. In such a case, for example, the processor may receive a packet 42 from device 24c having an IPID of 200. Due to 200 not sequentially following the IPID of the last packet ("Packet N") of packet aggregation 36e, the processor does not aggregate packet 42 in packet aggregation 36e, but rather, initiates a separate packet aggregation 36d.

It is emphasized that first stage 47 is performed for all of the received packets, regardless of which network(s) the packets are received from. Thus, the packet aggregations may collectively belong to a plurality of networks. For example, while packet aggregation 36a may include packets communicated from LAN 22, packet aggregation 36b may include packets communicated from LAN 23 or cellular network 25, rather than LAN 22.

For operating systems other than Windows (R), which do not assign IPIDs to packets, the aggregation of the packets may be based on other fields included in the packet headers. The processor may use operating-system (OS) fingerprinting techniques to determine from which operating system each of the packets was communicated, and hence, select an appropriate field for aggregating the packet.

For example, upon identifying a packet communicated from the Linux (R), Android (R), or iOS (R) operating system, the processor may use the TCP timestamp field, which increases linearly as a function of the clock time of the device, to aggregate the packet into a preexisting packet aggregation. This technique will now be described in detail, with reference now being made to FIG. 4, which shows a plot 75 illustrating a method for aggregating packets based on their TCP timestamps, in accordance with some embodiments described herein. Each packet received by the processor is indicated in plot 75 by a respective marker 68, which is plotted at the horizontal position corresponding to the time at which the packet was received, and at the vertical position corresponding to the TCP timestamp (TS) of the packet. (For ease of description, the paragraphs below may refer to particular markers, which are labeled in FIG. 4, as "packets," given that, as explained, these markers correspond to respective packets.)

Figure 4:
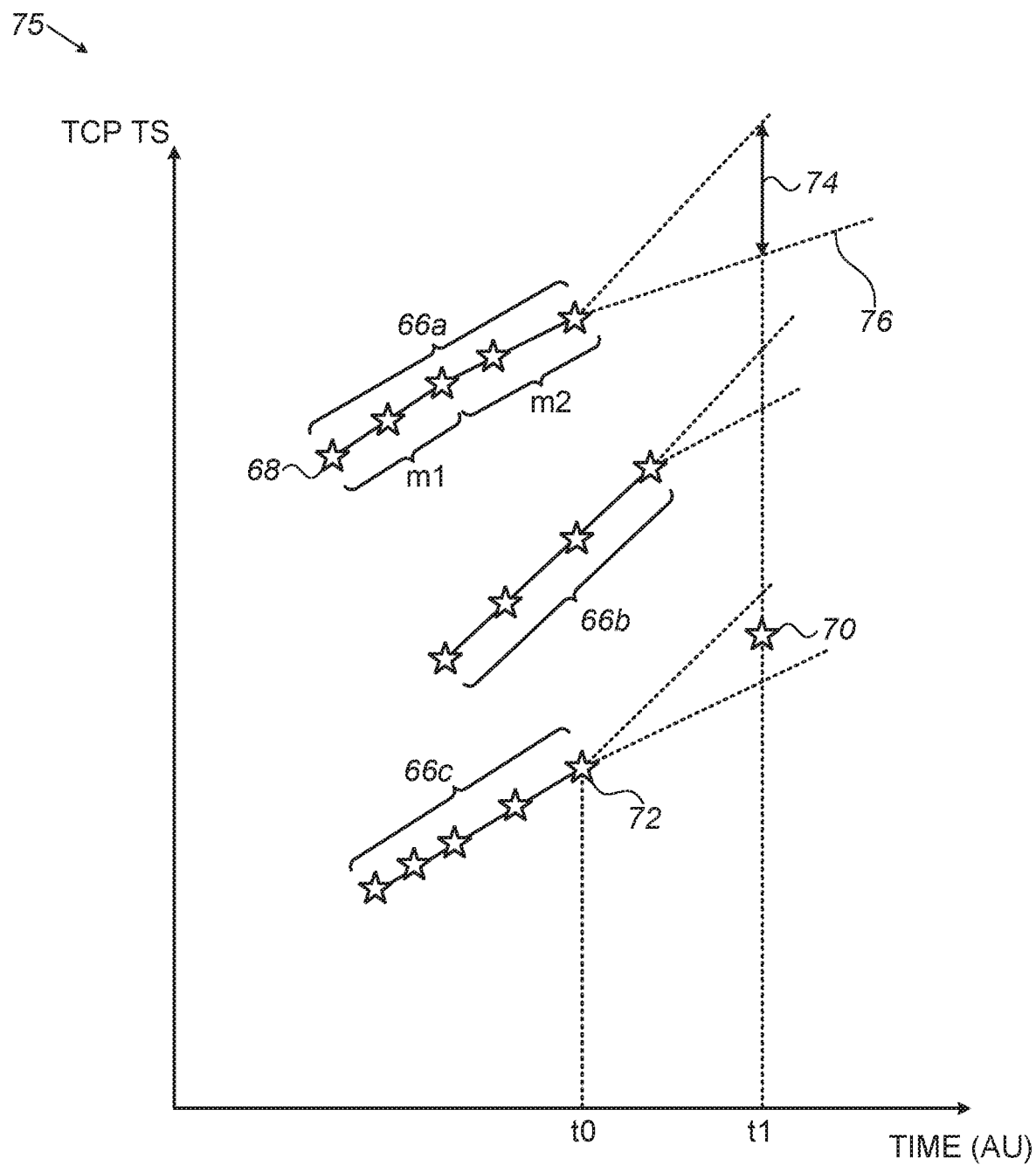
FIGS. 4-5 show plots illustrating respective methods for aggregating packets based on their TCP timestamps, in accordance with some embodiments described herein.

As described above, upon receiving a given packet, the processor, at checking step 50, checks whether the packet belongs to a preexisting packet aggregation. If yes, the processor, at aggregating step 52, aggregates the packet into the appropriate preexisting packet aggregation; otherwise, the processor uses the packet to initialize a new packet aggregation. FIG. 4 illustrates a scenario in which the processor, by performing the above steps, has initialized, and augmented, three packet aggregations. Each of these packet aggregations is indicated in plot 75 by a connected sequence of markers. In particular, a first connected sequence 66a indicates a first packet aggregation, a second connected sequence 66b indicates a second packet aggregation, and a third connected sequence 66c indicates a third packet aggregation. (For ease of description, each such connected sequence may be referred to as a "packet aggregation," given that the connected sequence indicates a packet aggregation.)

It is noted that the TCP timestamp of a device tends to increase at a rate that varies in response to various factors, such as the degree to which the battery of the device is charged, and whether the battery of the device is currently being charged. Hence, the TCP timestamp tends to increase in a piecewise linear fashion. Such a piecewise linear increase is indicated in FIG. 4 for packet aggregation 66a. In particular, the line that connects the markers for this packet aggregation includes two segments having different respective slopes: a first segment having a slope m1, and a second segment having a slope m2 that is less than m1.

Per the technique illustrated in FIG. 4, two packets may be aggregated together in response to at least one of two conditions being met. First, the packets may be aggregated together if they belong to the same TCP connection, as evidenced by the two packets sharing a common TCP 5-tuple, as described above with reference to FIGS. 2-3. Second, the packets may be aggregated together if the TCP timestamp included in the later packet—more specifically, in the header thereof—is within an expected offset range from the TCP timestamp included in the earlier packet.

Hence, upon receiving a packet, the processor first checks, at checking step 50, whether the newly-received packet belongs to the same TCP connection as the last-received packet in any of the existing packet aggregations. If not— i.e., if the newly-received packet belongs to a TCP connection that was not heretofore seen—the processor next checks whether the TCP timestamp of the newly-received packet is within an expected offset range from the TCP timestamp of one of the last-received packets. (The last-received packet of a packet aggregation has the highest TCP timestamp in the packet aggregation.) If yes, the processor aggregates the newly-received packet into the appropriate packet aggregation. Otherwise, the processor initializes a new packet aggregation with the newly-received packet.

In some embodiments, the processor computes the expected offset range for a given packet aggregation, based on the rate of increase of the TCP timestamp over the last few minutes (e.g., the last 5-30 minutes) in the packet aggregation during which packets were received. In particular, the processor may define an expected offset range that straddles the offset that would be obtained with this historical rate of increase. For example, the processor may ascertain that m2=100 s$^{-1}$, i.e., the processor may ascertain that the TCP timestamp in packet aggregation 66a recently increased by 100 per second. In response thereto, the processor may define an expected TCP timestamp rate-of-increase range that straddles 100 s$^{-1}$, such as a range of between 90 s$^{-1}$ and 120 s$^{-1}$. This range, in turn, implies an expected offset range for any subsequently received packet. For example, for an expected TCP timestamp rate-of-increase range of 90-120 s$^{-1}$, a packet received dt seconds after the last-received packet of packet aggregation 66a would have an expected offset range of between 90*dt and 120*dt. Thus, for example, if the last-received packet in packet aggregation 66a has a TCP timestamp of 700 and was received at a time of 10 seconds, the processor may compute an expected offset range of between 745 and 760 for a packet subsequently received at 10.5 seconds. In other words, if the TCP timestamp of the subsequently-received packet lies between 745 and 760, the processor may aggregate the subsequently-received packet into packet aggregation 66a.

Otherwise, the processor may aggregate the subsequently-received packet into another packet aggregation, or use the subsequently-received packet to initialize a new packet aggregation.

FIG. 4 illustrates expected offset ranges for each packet aggregation, by showing hypothetical extension lines 76 that extend from the last-received packet of the packet aggregation. Any packet received subsequently to the last-received packet is aggregated into the packet aggregation, only if the TCP timestamp of the packet lies between the extension lines 76 for the packet aggregation. Thus, for example, a packet 70, received at time t1, is not aggregated into packet aggregation 66a, given that the TCP timestamp of packet 70 does not lie within the range 74 that lies between extension lines 76 of packet aggregation 66a at t1. (Rather, packet 70 is aggregated into packet aggregation 66c, as described below.)

Notwithstanding the above, in many cases the expected offset range cannot be accurately computed, based only on the rate of increase of the TCP timestamp over the last few minutes of packet history in the packet aggregation. For example, in some cases, a large duration of time may have passed from receipt of the last-received packet, such that the last few minutes of packet history are not recent. FIG. 4 illustrates such a scenario, whereby the last-received packet of packet aggregation 66c was received at time t0, but no subsequent packet belonging to packet aggregation 66c was received prior to time t1, which is significantly later than t0. In such a scenario, the rate of increase of the TCP timestamp is likely to have changed between t0 and t1.

To address this challenge, embodiments of the present disclosure further provide more sophisticated techniques for computing the expected offset ranges. For example, the processor may apply a machine-learned model that computes the expected offset range. Such a model may assume that the rate of increase of the TCP timestamp varies as a function of various parameters that may be extracted from a packet aggregation, such as the receipt times of the packets, network latency, an average bandwidth used by the device, TCP retransmission rates, average connection lengths, and the rate of new connections per second. Hence, given a packet aggregation as input, the model may compute an expected offset range for the packet aggregation.

Alternatively or additionally, the machine-learned model may assume that the rate of increase of the TCP timestamp varies as a function of a time of day, in that, for example, the battery charge level of the device varies over the course of the day. Thus, for example, the model may predict a greater rate of increase during times at which the battery of the device is more likely to be fully (or mostly) charged, such as at the beginning of the morning. Alternatively or additionally, the model may predict a greater rate of increase during times at which the battery of the device is more likely to be currently charging, such as at nighttime.

In some embodiments, the machine-learned model is a deep neural network (DNN), such as a DNN having an autoencoder architecture. Such a network may be trained (daily, for example) on an input data set that includes a large number of TCP connections. Based on this input, the network may learn the parameters that influence, or correlate with, the rate of increase of the TCP timestamp. (Examples of such parameters are provided above.) Subsequently, upon being provided with a packet aggregation, the network may extract these parameters from the packet aggregation, and then use these parameters to compute the expected offset range.

For example, upon receiving packet 70, which belongs to a TCP connection not heretofore seen, the processor may pass packet aggregation 66c into a trained DNN. The DNN may then predict the rate of increase of the TCP timestamp between t0 and t1, and thus, compute an expected offset range for t1. The processor may then aggregate packet 70 into packet aggregation 66c, based on the TCP timestamp of packet 70 being within the expected offset range from the TCP timestamp of packet 72, the last-received packet of packet aggregation 66c.

Figure 5:
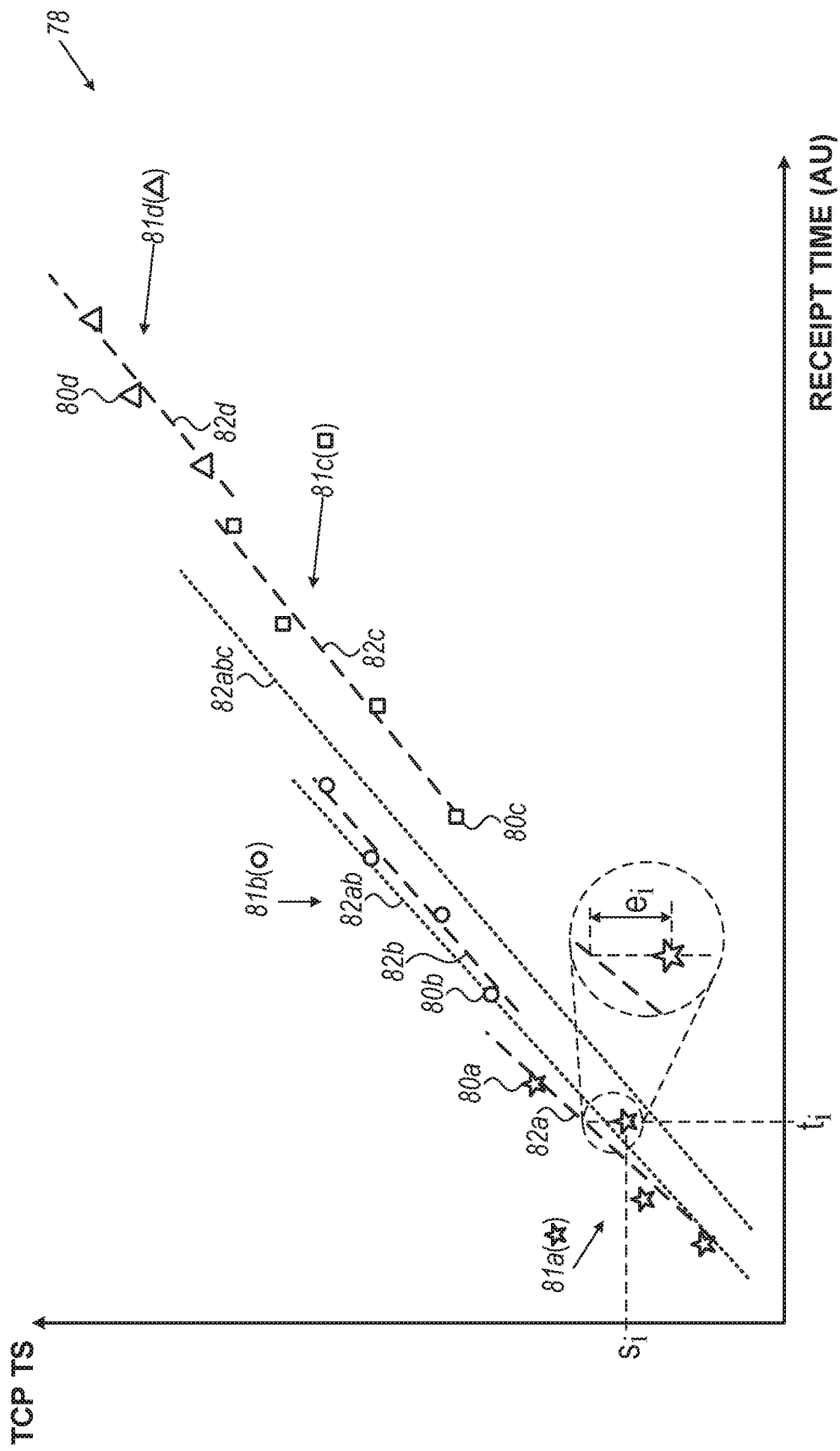

Reference is now made to FIG. 5, which shows a plot 78 illustrating another method for aggregating packets based on their TCP timestamps, in accordance with some embodiments described herein. Similarly to FIG. 4, FIG. 5 relates to a scenario in which processor 34 receives a plurality of packets (sharing a single source IP address) that belong to respective TCP connections associated with an unknown number of respective devices. FIG. 5 illustrates yet another way in which processor 34 may, based on the TCP timestamps of the packets, identify any subset of the TCP connections that are associated with the same device.

As described above with reference to FIG. 4, processor 34 first identifies the respective TCP timestamps of the packets, and the respective receipt times at which the packets were received. The processor then represents the received packets by different respective two-dimensional coordinates. In particular, each packet is represented by a two-dimensional coordinate $(t_i, s_i)$, where $t_i$ is the receipt time at which the packet was received by the processor or by the relevant network tap, and $s_i$ is the TCP timestamp (TCP TS) of the packet. The processor also identifies the TCP connection to which each of the packets belongs. (Typically, the TCP connection of each packet is identified immediately upon receipt of the packet.) Typically, the identification of the TCP connection is based on the TCP 5-tuple of the packet, such that all packets sharing a particular TCP 5-tuple are assumed to belong to a single TCP connection, and the number of TCP connections is equal to the number of unique TCP 5-tuples.

By way of example, FIG. 5 shows four different TCP connections, using a different type of marker to represent each of the connections. In particular, first packets 80a belonging to a first TCP connection 81a are shown as stars, second packets 80b belonging to a second TCP connection 81b are shown as circles, third packets 80c belonging to a third TCP connection 81c are shown as squares, and fourth packets 80d belonging to a fourth TCP connection 81d are shown as triangles.

Subsequently to identifying the different TCP connections, the processor forms one or more partitions of the TCP connections into a plurality of TCP-connection subsets, each of which includes each packet that belongs to any one of the TCP connections in the subset. (It is noted that a TCP-connection subset may alternatively be referred to as a "packet aggregation" or "TCP-connection aggregation.") For example, one possible partition, indicated by the notation {(81a,81b,81c),(81d)}, aggregates first TCP connection 81a, second TCP connection 81b, and third TCP connection 81c into a first TCP-connection subset, and assigns fourth TCP connection 81d to a second TCP-connection subset. Another possible partition {(81a,81b),(81c,81d)} aggregates the first and second TCP connections into a first TCP-connection subset, and the third and fourth TCP connections into a second TCP-connection subset.

By assigning two given TCP connections to the same TCP-connection subset, the processor effectively hypothesizes that the two TCP connections are associated with the same device, i.e., that all of the packets belonging to the TCP-connection subset were communicated from the same device. In general, it is expected that if two given TCP connections are associated with the same device, the TCP timestamps of the packets belonging to these TCP connections should increase approximately linearly with the receipt times of these packets. Hence, while or subsequently to forming each partition, the processor tests whether each of the TCP-connection subsets in the partition satisfies this expectation. Based on this test, the processor may accept or reject the partition.

For example, for each partition that is formed, the processor may calculate, for each of the TCP-connection subsets in the partition, the deviation by which the relationship between (i) the respective TCP timestamps of those of the packets belonging to the TCP-connection subset, and (ii) the respective receipt times at which those of the packets belonging to the TCP-connection subset were received, deviates from a linear relationship. The processor may further calculate a threshold deviation for the TCP-connection subset. If the deviation exceeds the threshold deviation, the processor may reject the TCP-connection subset, and hence reject the partition. Otherwise, the processor may deem the TCP-connection subset to be valid. If all of the TCP-connection subsets in a particular partition are valid, the processor considers the partition to be valid.

Typically, the deviation is a mean squared error (MSE) that would result from fitting a line to the two-dimensional coordinates that represent the packets belonging to the TCP-connection subset, and the threshold deviation is a threshold MSE. For example, for TCP-connection subset (81$a$,81$b$), the processor may calculate the MSE that would result from fitting a single line 82$ab$ to the coordinates that collectively represent all of packets 80$a$ and 80$b$. For example, if line 82$ab$ is described by the equation s=At+B, where s represents the TCP timestamp variable and t represents the receipt time variable, the processor may calculate, for each coordinate ($t_i$, $s_i$) in the TCP-connection subset, a fit error $e_i = At_i + B - s_i$. The processor may then calculate the MSE by summing the squares of these errors, and dividing the sum by the number of packets in the TCP-connection subset. The processor may then compare this MSE to the threshold MSE. If the MSE is less than the threshold, the processor may deem the TCP-connection subset to be valid, as described above. Otherwise, the processor may reject the TCP-connection subset.

It is noted that the processor may compute the MSE even without explicitly fitting a line to the coordinates, i.e., without explicitly calculating the parameters "A" and "B." For example, the MSE may be calculated as $Y + nS^2 - (M + nST)^2/(X + nT^2)$, where (i) n is the number of packets (i.e., coordinates) in the TCP-connection subset, (ii) $Y = \Sigma_1^n s_i^2$, (iii) S is a reference TCP timestamp, such as the average of the $s_i$, (iv) $M = \Sigma_1^n t_i s_i$, (v) T is a reference receipt time, such as the average of the $t_i$, and (vi) $X = \Sigma_1^n t_i^2$.

Typically, the processor calculates the threshold MSE for a given TCP-connection subset as a function of the respective single-TCP-connection MSEs of the TCP connections belonging to the subset. In other words, for each TCP connection, the processor may calculate a respective single-TCP-connection MSE that would result from fitting a line to the coordinates that represent the packets belonging to the TCP connection. Subsequently, to calculate the threshold MSE for a given TCP-connection subset, the processor may apply an appropriate function to the respective single-TCP-connection MSEs of the TCP connections belonging to the subset, such as to compute the threshold MSE for the subset.

(If a particular TCP connection includes fewer than a predetermined minimum number of packets, such as fewer than three packets, the processor does not compute the MSE of this TCP connection, such that this TCP connection does not contribute to the calculation of the threshold MSE.)

For example, the processor may calculate an average of the single-TCP-connection MSEs, and then calculate the threshold by multiplying this average by a predetermined factor, such as any factor between three and six. In some embodiments, the average of the single-TCP-connection MSEs is a weighted average. For example, prior to calculating the average, the processor may weight each of the single-TCP-connection MSEs by the number of the packets that belong to the TCP connection to which the single-TCP-connection MSE corresponds. Thus, a TCP connection that includes more packets may contribute more to the threshold, relative to a TCP connection that includes fewer packets.

For example, to calculate the threshold for a TCP-connection subset (81$a$,81$b$), the processor may first calculate a first MSE, which would result from fitting a first line 82$a$ to packets 80$a$, and a second MSE, which would result from fitting a second line 82$b$ to packets 80$b$. The processor may then calculate the threshold MSE as a suitable multiple of the average of the first and second MSEs. Subsequently, to decide whether the subset (81$a$,81$b$) is valid, the processor may compare the MSE for subset (81$a$,81$b$) to the threshold MSE.

Alternatively to computing the threshold MSE as an average of the single-TCP-connection MSEs, the processor may calculate the threshold MSE in any other suitable way. For example, the processor may calculate the threshold MSE as a function of (e.g., a multiple of) the MSE of a single TCP connection belonging to the TCP-connection subset, such as the TCP connection having the greatest number of packets relative to the other TCP connections in the subset.

Alternatively or additionally to using the MSE to quantify the degree to which the relationship between the TCP timestamps and the receipt times deviates from a linear relationship, the processor may use other suitable measure of deviation. For example, the processor may fit a higher-order polynomial (i.e., a polynomial of order two or more) to the coordinates, and then calculate the deviation as a function of one or more higher-order coefficients of the polynomial.

In some embodiments, the processor forms multiple different partitions of the TCP connections, and then tests each of these partitions as described above. The processor may then select one of the partitions, in response to ascertaining that the partition is valid, i.e., that all of the respective deviations (e.g., MSEs) of the TCP-connection subsets are less than their respective thresholds. For example, the processor may identify the "optimal" valid partition, i.e., the valid partition having the smallest number of TCP-connection subsets, relative to the other valid partitions. In the event that multiple valid partitions share the smallest number of TCP-connection subsets, the processor may, for each of these partitions, average the respective deviations of the TCP-connection subsets, and then select the partition having the smallest average deviation.

In other embodiments, to reduce execution time, the processor forms a single, valid partition of the TCP connections, which the processor validates as the partition is formed. For example, the processor may iteratively select a TCP connection that does not yet belong to a TCP-connection subset, and then iteratively (i) select a TCP-connection subset, (ii) test whether the selected TCP connection may be added to the selected TCP-connection subset, and, (iii)

provided that the selected TCP connection passes the test, add the selected TCP connection to the selected TCP-connection subset. To test whether the selected TCP connection may be added to the selected TCP-connection subset, the processor may tentatively augment the selected TCP-connection subset with the selected TCP connection, calculate the deviation and threshold deviation (as described above) for the tentatively-augmented TCP-connection subset, and then compare the deviation to the threshold deviation.

Figure 6:
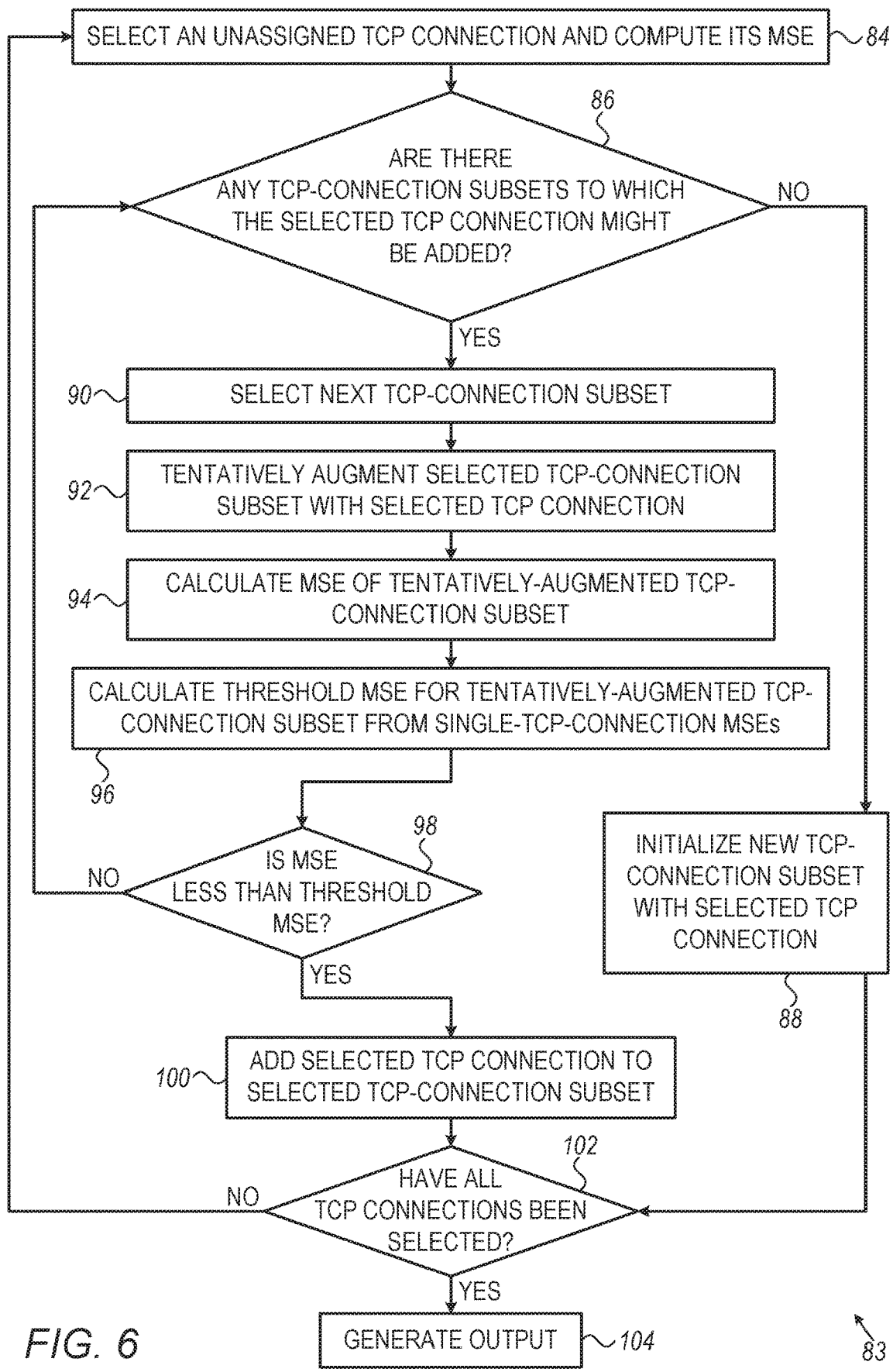
FIG. 6 is a flow diagram for a method for partitioning a plurality of TCP connections and generating output responsively thereto, in accordance with some embodiments described herein.

An example of such an embodiment is illustrated in FIG. 6, which is a flow diagram for a method 83 for partitioning a plurality of TCP connections and generating output responsively thereto, in accordance with some embodiments described herein.

First, at a TCP-connection-selecting step 84, the processor selects an unassigned TCP connection, i.e., a TCP connection that does not yet belong to any of the TCP-connection subsets, and computes its MSE. (Alternatively, the processor may compute the respective MSEs of all of the TCP-connection subsets before performing TCP-connection-selecting step 84.) Next, at a first checking step 86, the processor checks if there are any TCP-connection subsets to which the selected TCP connection might be added. In other words, the processor checks if there are any TCP-connection subsets to which the processor has not yet attempted adding the selected TCP connection. If not—i.e., if all of the TCP-connection subsets have been tried, or if no TCP-connection subsets have been initialized yet—the processor initializes a new TCP-connection subset with the selected TCP connection, at a subset-initializing step 88. (In other words, the processor creates a new TCP-connection subset that includes the selected TCP connection.) Otherwise, at a subset-selecting step 90, the processor selects the next TCP-connection subset to which the selected TCP connection might be added.

Subsequently to selecting the TCP-connection subset, the processor, at a tentative-augmenting step 92, tentatively augments the selected TCP-connection subset with the selected TCP connection. In other words, the processor tentatively adds the selected TCP connection to the selected TCP-connection subset, such as to form a tentatively-augmented TCP-connection subset. Next, at an MSE-calculating step 94, the processor calculates the MSE of the tentatively-augmented TCP-connection subset, i.e., the processor calculates the MSE that would result from fitting a line to the two-dimensional coordinates that represent the subset of the packets belonging to the tentatively-augmented TCP-connection subset. The processor also calculates, at a threshold-calculating step 96, a threshold MSE for the tentatively-augmented TCP-connection subset, from the respective single-TCP-connection MSEs of the TCP connections belonging to the tentatively-augmented TCP-connection subset. (Threshold-calculating step 96 may be performed before or after MSE-calculating step 94.)

Subsequently, at a second checking step 98, the processor checks if the MSE of the tentatively-augmented TCP-connection subset is less than the threshold MSE. If yes, the processor adds the selected TCP connection to the selected TCP-connection subset, at a subset-augmenting step 100. Otherwise, the processor returns to first checking step 86.

It is noted that the processor does not always need to tentatively augment the selected TCP-connection subset with the selected TCP connection, and then compute the MSE of the tentatively-augmented subset. Rather, in some cases, the processor may quickly rule out the addition of the TCP connection to the subset (and hence return to first checking step 86 directly from subset-selecting step 90), by performing a quick sanity check on the addition. For example, the processor may rule out the addition of the TCP connection to the subset, in response to a first packet, which belongs to the subset, having (i) a receipt time that is greater than the receipt time of a second packet, which belongs to the TCP connection, but (ii) a TCP timestamp that is less than the TCP timestamp of the second packet. Similarly, the processor may rule out the addition of the TCP connection to the subset, in response to a first packet, which belongs to the TCP connection, having (i) a receipt time that is greater than the receipt time of a second packet, which belongs to the subset, but (ii) a TCP timestamp that is less than the TCP timestamp of the second packet.

Subsequently to adding the selected TCP connection to an existing TCP-connection subset at subset-augmenting step 100, or using the selected TCP connection to initialize a new TCP-connection subset at subset-initializing step 88, the processor checks, at a third checking step 102, whether all of the TCP connections have been selected. If not, the processor returns to TCP-connection-selecting step 84. Otherwise, the processor terminates the partitioning of the TCP connections, and, in response to the partitioning, generates an appropriate output at an output-generating step 104, as further described below.

For example, with reference to FIG. 5, the processor may initially select first TCP connection 81a, and use this TCP connection to initialize a first TCP-connection subset. Subsequently, the processor may select second connection 81b. The processor may then test if second connection 81b may be added to the first TCP-connection subset. In other words, the processor may compute the MSE and threshold MSE for the hypothetical TCP-connection subset (81a,81b), and compare these quantities to one another. In response to the MSE being less than the threshold MSE, the processor may accept the subset (81a,81b), thus effectively positing that the first and second TCP connections are associated with the same device.

Next, the processor may select third TCP connection 81c. The processor may then ascertain that the MSE of the first TCP-connection subset would exceed the relevant threshold, if the first TCP-connection subset were to include third TCP connection 81c. The processor may therefore assign the third TCP connection to a new, second TCP-connection subset. Subsequently, the processor may select fourth TCP connection 81d, and assign this TCP connection to the second TCP-connection subset, thus obtaining the partition {(81a, 81b),(81c,81d)}. (Prior to assigning the fourth TCP connection to the second TCP-connection subset, the processor may check if the fourth TCP connection may be assigned to the first TCP-connection subset.)

In some embodiments, the processor partitions the TCP connections after all of the relevant packets have been received (e.g., in response to a request from a user), as implied in the above description of FIG. 6. Alternatively, the processor may partition the TCP connections in real-time (i.e., "on the fly"), as the packets are received. Thus, for example, upon the receipt of each new packet belonging to an existing TCP connection, the processor may re-compute the MSE and threshold MSE for the TCP-connection subset to which the TCP connection belongs. If the MSE exceeds the threshold, the processor may remove the TCP connection from the subset, and then assign the TCP connection to a different subset, such as a new subset that is initialized by the processor. To conserve computing time and resources, the processor may partition the TCP connections in "delayed real-time," such that, for example, the processor refrains from assigning a particular TCP connection to a TCP-connection subset until a minimum number of packets (e.g., between three and ten packets) belonging to the TCP connection have been received, or until all of packets in the TCP connection have been received. (The processor may confirm that the TCP connection has been fully received in response to a predefined threshold duration having passed without the processor having received any packets belonging to the TCP connection.)

In some embodiments, subsequently to rejecting the inclusion of a particular TCP connection in a particular TCP-connection subset, the processor saves an indication that this particular inclusion should not be tested again. In other embodiments, the processor may allow this inclusion to be tested again, e.g., in response to new packets having been received.

In some embodiments, the processor combines the techniques described with reference to FIGS. 5-6 with the techniques described above with reference to FIG. 4. For example, upon receiving a packet belonging to a new TCP connection, the processor may, in deciding whether to assign the new TCP connection to an existing TCP-connection subset, take into account both (i) the MSE and threshold MSE that would result from such an assignment, and (ii) the expected offset range for the TCP timestamp of the packet.

In response to partitioning the TCP connections (and subsequently validating the partition, if the validation was not already performed while the partition was formed), the processor generates an output that indicates that each one of the TCP-connection subsets is associated with a single one of the devices. This output may include a visual output on monitor 46, and/or an internal output to another module executed by the processor. For example, the internal output may be delivered to a module that performs the grouping function described below with reference to FIGS. 2-3. Alternatively or additionally, the internal output may be delivered to a module that, in response to the output, associates information contained in a first TCP connection with other information contained in a second TCP connection that belongs to the same TCP-connection subset as the first TCP connection. This module may further output the association, e.g., by displaying the association on monitor 46.

For example, with reference to FIG. 5, in response to first TCP connection 81a and second TCP connection 81b being associated with the same device, the processor may associate a name, location, or email address that appears in one of first packets 80a with a name, location, or email address that appears in one of second packets 80b, thus facilitating tracking and/or monitoring a subject of interest.

Second Stage 53

Reference is again made to FIGS. 2-3.

During, and/or following, the formation of each packet aggregation, the processor selects the packet aggregation, at a selecting step 54. The processor then attempts to extract, from the packet aggregation, relevant information that may be used to associate the packet aggregation with a specific device, or at least group the packet aggregation with other packet aggregations that were communicated from the same device. First, at a characteristic-identifying step 60, the processor identifies device-usage characteristics that are exhibited by the packet aggregation. As further described below, such characteristics may be used to group the packet aggregation with other packet aggregations that exhibit similar characteristics.

Next, at a device-identifier-seeking step 56 (which, in some embodiments, may be performed prior to characteristic-identifying step 60), the processor attempts to identify, in at least one packet belonging to the packet aggregation, at least one device identifier that uniquely identifies the device from which the packet was communicated. Such a device identifier may be used to associate the packet aggregation with a particular device, and thus, by definition, group the packet aggregation together with other packet aggregations associated with the same device.

In general, a suitable device identifier is that which is assigned uniquely per device, such that, with a relatively high probability, over a relatively long period of time, no two devices will share the same such identifier. For example, in the context of the present application, including the claims, a device identifier may be said to "uniquely identify" a particular device if there is a probability of less than one in one million that over a period of at least one year, another device will share the same identifier. Due to being uniquely assigned, such a device identifier may be said to identify the device from which the packet (and hence, packet aggregation) was communicated.

To be suitable, the device identifier must also, typically, be persistent—i.e., it cannot change too frequently. For example, a session cookie is typically not a suitable device identifier, despite being unique. In general, a device identifier may be suitably persistent if, on average, it does not change for at least 24 hours.

Examples of suitable device identifiers include cookies communicated by various applications (e.g., "_utma," "_cfduid," "_gads," "bcookie," "obuid," "OptimizelyEndUserId," "taboola_fp_td_user_id," "csrftoken," or "_hjuserid"), identifiers for advertisers (IDFAs), identifiers for vendors (IDFVs), Android advertising identifiers (AAIDs), universally unique identifiers (UUIDs), international mobile station equipment identities (IMEIs), international mobile subscriber identities (IMSIs), and media access control (MAC) addresses.

Alternatively or additionally, any other identifier that appears consistently, unencrypted, in traffic sent from a particular application, and is assigned uniquely per device, may be used for associating a packet aggregation with a device. Such an identifier may be specific to the application (e.g., a device-specific username for the application), or unspecific to the application (e.g., a phone number of the device).

Alternatively or additionally, any suitable aggregation of "quasi-identifiers" may constitute a suitable device identifier. In other words, even if each of a plurality of identifiers is not sufficiently unique when considered alone, the plurality of identifiers may be sufficiently unique when considered in aggregation. For example, a suitable device identifier may include the aggregation of a particular Internet cookie, a user-agent identifier, and an email address.

To identify the device identifier, the processor typically decodes at least one of the packets in the packet aggregation. For example, the processor may iterate through the packets in the packet aggregation, until the processor comes across the string "IDFA:". Recognizing the string "IDFA:", the processor then interprets the following string as the IDFA of the device. As another example, the processor may extract a cookie, upon recognizing the appropriate preceding string (e.g., "_utma"). In some cases, the processor may perform full application decoding, i.e., the processor may extract the identifier only after first interpreting the entire content of the packet.

If the processor identifies a device identifier in the packet aggregation, the processor then checks, at a first group-seeking step 58, whether another group of packet aggregations includes the same device identifier. If yes, the processor, at a grouping step 64, groups the packet aggregation into the group of packet aggregations that shares the device identifier. (In other words, the processor associates the packet aggregation with the device, identified by the device identifier, from which the packets belonging to the packet aggregation were communicated.)

For example, FIG. 3 depicts a particular packet 44, which belongs to packet aggregation 36a, including a particular IDFA. In response to identifying this IDFA in packet 44, the processor associates packet aggregation 36a, in its entirety, with device 24a, which is identified by the IDFA. (The processor does not necessarily know anything more about device 24a, beyond the IDFA of device 24a.) Similarly, packet aggregation 36b, which includes a packet 45 that includes the same IDFA, is also associated with device 24a. Packet aggregation 36c, on the other hand, is associated with device 24b, rather than device 24a, given that packet aggregation 36c includes a different IDFA from that which was identified in packet aggregations 36a and 36b.

By performing the device-identifier-based grouping described above, the processor facilitates identifying the number of, and respective identities of, devices that use a particular NAT. Moreover, the device identifiers allow each packet aggregation to be associated with the appropriate device, irrespective of the network from which the packet aggregation emanated. Thus, communication exchanged with any particular one of the devices may be monitored, even if the particular device moves between networks.

If, on the other hand, the packet aggregation does not include a suitable device identifier, or if no other existing group of packet aggregations includes the identified device identifier, the processor, at a second group-seeking step 57, checks whether any existing group (i) is not known to include a device identifier that is different from that of the packet aggregation, and (ii) exhibits device-usage characteristics that are similar to those that are exhibited by the packet aggregation. If yes, the packet aggregation is added to the group, at grouping step 64. Otherwise, a new group is created, at group-creating step 62, and the packet aggregation is then added to the new group.

Since the manner in which a device is used is typically not strongly dependent on the network within which the device is used, the device-usage characteristics may be used for grouping across networks. Thus, for example, device-usage characteristics may be used to group together all of the packet aggregations from device 24a, even if some of the packet aggregations came from LAN 22, others from LAN 23, and yet others from cellular network 25.

In some embodiments, the device-usage characteristics are based on destination IP addresses included in the packet aggregations. In such embodiments, upon identifying that two packet aggregations include similar sets of destination IP addresses, the processor may group the two packet aggregations together, as this similarity indicates that the two packet aggregations emanated from the same device. (In other words, it is unlikely that two different users would independently use their respective devices to access similar sets of IP addresses.) For example, the processor may compare the overlap, between the respective sets of destination IP addresses, to a threshold, and group the two packet aggregations together if this overlap exceeds the threshold.

Alternatively or additionally, the device-usage characteristics may be based on domain name system (DNS) queries included in the packet aggregations, and/or on the respective times at which the packets, in the packet aggregations, were communicated. In this regard, some hypothetical data, assumed to have been obtained by the processor at characteristic-identifying step 60, are provided in Table 1 below. In the ensuing description, it will be assumed that packet aggregations 36a-36e do not include suitable device identifiers, and therefore, the grouping of packet aggregations 36a-36e is based solely on the device-usage characteristics in Table 1.

TABLE 1

| Device-usage characteristic (time-based) | Percent of packets in 36a | Percent of packets in 36b | Percent of packets in 36c | Percent of packets in 36d | Percent of packets in 36e |
|---|---|---|---|---|---|
| Used between 6 am and 9 am | 50% | 45% | 5% | 32% | 10% |
| Used between 9 am and 6 pm | 12% | 10% | 85% | 35% | 2% |
| Used after 6 pm | 38% | 45% | 10% | 33% | 88% |

| Device-usage characteristic (DNS-query-based) | Percent of DNS queries in 36a | Percent of DNS queries in 36b | Percent of DNS queries in 36c | Percent of DNS queries in 36d | Percent of DNS queries in 36e |
|---|---|---|---|---|---|
| Used to read the news | 70% | 52% | 15% | 16% | 14% |
| Used for social media | 5% | 20% | 10% | 34% | 38% |
| Used for trading stocks | 0% | 5% | 63% | 22% | 19% |
| Used for other uses | 25% | 23% | 12% | 28% | 29% |

At second group-seeking step 57, the processor looks for similarities in the respective device-usage characteristics. For example, packet aggregations 36a and 36b share similar time-based usage characteristics, in that the respective percentage of total packets communicated within each time slot is approximately the same for each of these two packet aggregations. (To ascertain this similarity, the processor may verify that for each of the time slots, the respective percentages for the two packet aggregations are within a given threshold of one another, e.g., 10%.) The processor, therefore, at grouping step 64, groups packet aggregations 36*a* and 36*b* together, since the similarity between the respective usage characteristics indicates that the packets of packet aggregations 36*a* and 36*b* were communicated from a single device (in this case, device 24*a*).

Likewise, packet aggregations 36*d* and 36*e* share similar DNS-query-based device-usage characteristics, in that the respective percentage of DNS queries for each usage category is approximately the same for each of the two packet aggregations. (Also in this case, to ascertain the similarity, the processor may compare the differences between the percentages to relevant thresholds.) The processor therefore groups packet aggregations 36*d* and 36*e* together, since the similarity between the respective usage characteristics indicates that packet aggregations 36*d* and 36*e* originated from the same device—in this case, device 24*c*.

Packet aggregation 36*c*, on the other hand, differs from the other packet aggregations in both its time-based and DNS-query-based usage characteristics. Therefore, the processor does not group packet aggregation 36*c* together with any of the other packet aggregations.

By performing the techniques described above with reference to Table 1, the processor may identify the number of devices behind a particular NAT, and/or identify usage characteristics of the devices that may be of interest to the monitoring entity. Hence, even if the processor is unable to extract any persistent identifiers—or any identifiers at all—of the devices, useful information may nonetheless be obtained. Moreover, as described above, communication exchanged with any particular one of the devices may be monitored, even if the particular device moves between networks.

For example, a monitoring entity may use system 20 to monitor communication from one or more particular "target" LANs that use respective NATs. Assuming that the data in Table 1 was acquired by monitoring the LANs, system 20 may use the grouping techniques described above to ascertain that there are three devices that use the LANs. The data also indicate that of the three devices, one of the devices (device 24*a*) is used mostly in the mornings and evenings, mainly for checking the news and, to a lesser extent, for social media, and another one of the devices (device 24*b*) is used mainly during working hours, primarily for trading stocks. (The last one of the devices, device 24*c*, may not have any particular usage characteristics of interest.) This information may then be used, e.g., in combination with information derived from other sources, to learn about the identities, interests, professions, etc. of the people who use the LANs.

In practice, it is usually much more difficult to identify similarities between packet aggregations than is suggested above with reference to Table 1. Hence, processor 34 may use sophisticated machine-learning algorithms to learn rules for grouping packet aggregations together, based on similar device-usage characteristics. For example, the processor may apply any suitable supervised machine-learning algorithm, such as decision trees or forests, used for classification. For such supervised algorithms, "ground truth" may be provided either manually by a user, or automatically, as described in the paragraph immediately below. Alternatively or additionally, the processor may use any suitable unsupervised machine-learning algorithm, such as k-means, for clustering. (In such techniques, the packet aggregations are clustered into different respective clusters, which are equivalent to the "groups" described herein.) Such supervised and unsupervised techniques may learn rules that are based on any of the "features" (i.e., device-usage characteristics) that are described herein, and/or any other suitable features, such as packet sizes, times between packets, operating-system information, etc.

In some embodiments, the processor first computes a characteristic vector for each packet aggregation, where each element in the characteristic vector corresponds to a different respective destination IP address, and the value of this element represents the number of times, in the packet aggregation, that a connection was established with this destination IP address. Typically, each such characteristic vector will have a large number of elements (e.g., between 200,000 and 500,000 elements), most of these elements being zero-valued. (It is noted that the $i^{th}$ element corresponds to the same destination IP address for all of the vectors.) Hence, before processing these vectors, the processor typically reduces the dimensionality of each vector (e.g., using Singular Value Decomposition), such that the vectors may be meaningfully compared to each other. Next, the processor clusters (or "groups") the packet aggregations, based on similarities between the characteristic vectors. For example, the processor may group two packet aggregations together, in response to the angle between the respective characteristic vectors of these packet aggregations being less than a particular threshold, e.g., 10 degrees.

For example, it will be assumed that, following dimensionality reduction, a first packet aggregation has a characteristic vector (3, 4, 0, 0, 2), and a second packet aggregation has a characteristic vector (6, 7, 1, 1, 4). (In practice, a characteristic vector will typically have more than five elements, even after dimensionality reduction.) In such a case, the two packet aggregations may be clustered together, since the angle between their respective characteristic vectors—which is around nine degrees—is relatively small, indicating similar usage characteristics. In contrast, were the second packet aggregation to have a characteristic vector (0, 1, 6, 4, 0), the two packet aggregations would likely not be clustered together, since their respective characteristic vectors point in very different directions, indicating different usage characteristics.

It is noted that the process of dimensionality reduction may reveal similar usage characteristics between two or more packet aggregations, even if there is relatively little overlap between the destination IP addresses included in these packet aggregations. This is because the process of dimensionality reduction reduces a large number of elements corresponding to different respective IP addresses to a smaller number of elements corresponding to more general usage characteristics, or to relationships between these characteristics. For example, the value of a particular element in a reduced-dimensionality characteristic vector may represent the number of times the device was used to access financial news, or to a ratio of this number to the number of times the device was used to access sporting news. The processor may therefore ascertain that two packet aggregations, acquired on two different days, emanated from the same device, even if the device was not used to access the same financial news or sporting news resources on both of the days.

Notwithstanding the above, in some cases, the processor may group two packet aggregations together based on the destination IP addresses appearing in these packet aggregations, even if the respective characteristic vectors of these packet aggregations are not similar to one another, and even if one of the packet aggregations contains relatively few packets, such as only a single packet. For example, if a first packet aggregation includes a destination IP address that also appears in a second packet aggregation, but does not generally appear in other packet aggregations (i.e., the destination IP address is not commonly accessed by the population at large), the processor may group the first and second packet aggregations together.

It is emphasized that there is a useful synergy between the "device identifier" grouping/association method and the "device-usage characteristic" grouping method, in that the former may automatically provide ground truth that can be used to improve the accuracy of the latter. For example, the processor may extract relevant device-usage characteristics from a plurality of packet aggregations that were collectively associated with a plurality of devices using the "device identifier" method. The extracted device-usage characteristics, and associations with devices, may then be fed to a machine-learning algorithm. Given the set of features (the device-usage characteristics) and the corresponding set of classifications (the respective devices with which the packet aggregations were associated), the machine-learning algorithm may then learn a rule that can be subsequently used to group packet aggregations based on device-usage characteristics.

In some cases, a "quasi-identifier," which is not uniquely assigned per device, may be used to "fuzzily" associate a packet aggregation with a particular device, i.e., associate the packet aggregation with the device with a particular likelihood that may be significantly less than 100%. Examples of quasi-identifiers include email addresses, operating-system types, and user-agent identifiers. To calculate the likelihood, the processor typically analyzes historically-received packets that were definitively associated with particular devices, e.g., using unique device identifiers such as described above. For example, by analyzing historically-received packets, the processor may ascertain that 90% of the uses of the email address "bob@bobsworld.com" were on device 24a. In response thereto, the processor may associate a packet aggregation that includes "bob@bobsworld.com" with device 24a, with a likelihood of 90%. The fuzzy association may then be presented to an operator, and the operator may decide whether to accept or reject the association.

Referring again to FIG. 1, in response to aggregating the packets, extracting device identifiers, associating the packet aggregations with devices, grouping the packet aggregations, and/or any other relevant task associated with the techniques described herein, processor 34 generates an output. The output may comprise, for example, a visual output, displayed on a computer monitor 46, that informs the monitoring entity of the information that has been learned about the target of interest. In some embodiments, the output may follow the monitoring in real-time, informing the user of any relevant developments (such as the formation of a new packet aggregation, or the identification of a particular device identifier), and/or showing current information, such as the current number of packet aggregations. Such output may be presented in multiple levels of detail, such that, for example, by clicking on a particular packet aggregation or group of packet aggregations, the user is able to "dig down" and see details such as device identifiers or quasi-identifiers, device-usage characteristics (such as the top 10 accessed Internet domains), etc.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a network interface; and
a processor, configured to:
receive, via the network interface, a plurality of packets that belong to respective Transmission Control Protocol (TCP) connections associated with an unknown number of respective devices,
identify respective TCP timestamps of the packets, and respective receipt times at which the packets were received,
partition the TCP connections into a plurality of TCP-connection subsets, by iteratively:
selecting one of the TCP connections that does not yet belong to any of the TCP-connection subsets, and
iteratively:
selecting one of the TCP-connection subsets,
tentatively adding the selected one of the TCP connections to the selected one of the TCP-connection subsets, such as to form a tentatively-augmented TCP-connection subset to which a subset of the packets belong,
calculating a deviation by which a relationship between (i) the respective TCP timestamps of the subset of the packets, and (ii) the respective receipt times at which the subset of the packets were received, deviates from a linear relationship,
calculating a threshold deviation for the tentatively-augmented TCP-connection subset, and
provided that the deviation is less than the threshold deviation, adding the selected one of the TCP connections to the selected one of the TCP-connection subsets, and
in response to the partitioning, generate an output that indicates that each one of the TCP-connection subsets is associated with a single one of the devices.

2. The system according to claim 1, wherein the processor is further configured to represent the packets by respective two-dimensional coordinates, each of which includes (i) the receipt time of a respective one of the packets, and (ii) the TCP timestamp of the respective one of the packets,
wherein the deviation is a mean squared error (MSE) that would result from fitting a line to those of the two-dimensional coordinates that represent the subset of the packets, and
wherein the threshold deviation is a threshold MSE.

3. The system according to claim 2,
wherein the MSE is a multiple-TCP-connection MSE,
wherein the line is a multiple-TCP-connection line,
wherein the processor is further configured to calculate, for the TCP connections, respective single-TCP-connection MSEs, each of which would result from fitting a respective single-TCP-connection line to those of the two-dimensional coordinates that represent those of the packets belonging to a respective one of the TCP connections, and
wherein the processor is configured to calculate the threshold MSE as a function of those of the single-TCP-connection MSEs that belong to the tentatively-augmented TCP-connection subset.

4. The system according to claim 3, wherein the processor is configured to calculate the threshold MSE by:
calculating an average of those of the single-TCP-connection MSEs that belong to the tentatively-augmented TCP-connection subset, and
multiplying the average by a predetermined factor.

5. The system according to claim 4,
wherein the average is a weighted average, and
wherein the processor is further configured to, prior to calculating the weighted average, weight each of those of the single-TCP-connection MSEs that belong to the tentatively-augmented TCP-connection subset by a number of the packets that belong to the TCP connection to which the single-TCP-connection MSE corresponds.

6. The system according to claim 1, wherein the processor is further configured to, in response to the output, associate first information contained in a first one of the TCP connections with second information contained in a second one of the TCP connections that belongs to the same TCP-connection subset as the first one of the TCP connections.

7. A system, comprising:
a network interface; and
a processor, configured to:
receive, via the network interface, a plurality of packets that belong to respective Transmission Control Protocol (TCP) connections associated with an unknown number of respective devices,
identify respective TCP timestamps of the packets, and respective receipt times at which the packets were received,
partition the TCP connections into a plurality of TCP-connection subsets,
for each of the TCP-connection subsets:
calculate a deviation by which a relationship between (i) the respective TCP timestamps of those of the packets belonging to the TCP-connection subset, and (ii) the respective receipt times at which those of the packets belonging to the TCP-connection subset were received, deviates from a linear relationship,
calculate a threshold deviation, and
ascertain that the deviation is less than the threshold deviation, and
in response to the ascertaining, generate an output that indicates that each one of the TCP-connection subsets is associated with a single one of the devices.

8. A method, comprising:
receiving a plurality of packets that belong to respective Transmission Control Protocol (TCP) connections associated with an unknown number of respective devices;
identifying respective TCP timestamps of the packets, and respective receipt times at which the packets were received;
partitioning the TCP connections into a plurality of TCP-connection subsets, by iteratively:
selecting one of the TCP connections that does not yet belong to any of the TCP-connection subsets, and iteratively:
selecting one of the TCP-connection subsets,
tentatively adding the selected one of the TCP connections to the selected one of the TCP-connection subsets, such as to form a tentatively-augmented TCP-connection subset to which a subset of the packets belong,
calculating a deviation by which a relationship between (i) the respective TCP timestamps of the subset of the packets, and (ii) the respective receipt times at which the subset of the packets were received, deviates from a linear relationship,
calculating a threshold deviation for the tentatively-augmented TCP-connection subset, and
provided that the deviation is less than the threshold deviation, adding the selected one of the TCP connections to the selected one of the TCP-connection subsets; and
in response to the partitioning, generating an output that indicates that each one of the TCP-connection subsets is associated with a single one of the devices.

9. The method according to claim 8, further comprising representing the packets by respective two-dimensional coordinates, each of which includes (i) the receipt time of a respective one of the packets, and (ii) the TCP timestamp of the respective one of the packets,
wherein the deviation is a mean squared error (MSE) that would result from fitting a line to those of the two-dimensional coordinates that represent the subset of the packets, and
wherein the threshold deviation is a threshold MSE.

10. The method according to claim 9,
wherein the MSE is a multiple-TCP-connection MSE,
wherein the line is a multiple-TCP-connection line,
wherein the method further comprises calculating, for the TCP connections, respective single-TCP-connection MSEs, each of which would result from fitting a respective single-TCP-connection line to those of the two-dimensional coordinates that represent those of the packets belonging to a respective one of the TCP connections, and
wherein calculating the threshold MSE comprises calculating the threshold MSE as a function of those of the single-TCP-connection MSEs that belong to the tentatively-augmented TCP-connection subset.

11. The method according to claim 10, wherein calculating the threshold MSE comprises calculating the threshold MSE by:
calculating an average of those of the single-TCP-connection MSEs that belong to the tentatively-augmented TCP-connection subset; and
multiplying the average by a predetermined factor.

12. The method according to claim 11,
wherein the average is a weighted average, and
wherein the method further comprises, prior to calculating the weighted average, weighting each of those of the single-TCP-connection MSEs that belong to the tentatively-augmented TCP-connection subset by a number of the packets that belong to the TCP connection to which the single-TCP-connection MSE corresponds.

13. The method according to claim 8, further comprising, in response to the output, associating first information contained in a first one of the TCP connections with second information contained in a second one of the TCP connections that belongs to the same TCP-connection subset as the first one of the TCP connections.

14. A method, comprising:
receiving a plurality of packets that belong to respective Transmission Control Protocol (TCP) connections associated with an unknown number of respective devices;
identifying respective TCP timestamps of the packets, and respective receipt times at which the packets were received;
partitioning the TCP connections into a plurality of TCP-connection subsets;

for each of the TCP-connection subsets:
calculating a deviation by which a relationship between (i) the respective TCP timestamps of those of the packets belonging to the TCP-connection subset, and (ii) the respective receipt times at which those of the packets belonging to the TCP-connection subset were received, deviates from a linear relationship,
calculating a threshold deviation, and
ascertaining that the deviation is less than the threshold deviation; and
in response to the ascertaining, generating an output that indicates that each one of the TCP-connection subsets is associated with a single one of the devices.

15. A computer software product comprising a tangible non- transitory computer-readable medium in which program instructions are stored, which instructions, when read by a processor, cause the processor to:
receive a plurality of packets that belong to respective Transmission Control Protocol (TCP) connections associated with an unknown number of respective devices,
identify respective TCP timestamps of the packets, and respective receipt times at which the packets were received,
partition the TCP connections into a plurality of TCP-connection subsets, by iteratively:
selecting one of the TCP connections that does not yet belong to any of the TCP-connection subsets, and iteratively:
selecting one of the TCP-connection subsets,
tentatively adding the selected one of the TCP connections to the selected one of the TCP-connection subsets, such as to form a tentatively-augmented TCP-connection subset to which a subset of the packets belong,
calculating a deviation by which a relationship between (i) the respective TCP timestamps of the subset of the packets, and (ii) the respective receipt times at which the subset of the packets were received, deviates from a linear relationship,
calculating a threshold deviation for the tentatively-augmented TCP-connection subset, and
provided that the deviation is less than the threshold deviation, adding the selected one of the TCP connections to the selected one of the TCP-connection subsets, and
in response to the partitioning, generate an output that indicates that each one of the TCP-connection subsets is associated with a single one of the devices.

16. The computer software product according to claim 15, wherein the instructions further cause the processor to represent the packets by respective two-dimensional coordinates, each of which includes (i) the receipt time of a respective one of the packets, and (ii) the TCP timestamp of the respective one of the packets,
wherein the deviation is a mean squared error (MSE) that would result from fitting a line to those of the two-dimensional coordinates that represent the subset of the packets, and
wherein the threshold deviation is a threshold MSE.

17. The computer software product according to claim 16, wherein the MSE is a multiple-TCP-connection MSE,
wherein the line is a multiple-TCP-connection line,
wherein the instructions further cause the processor to calculate, for the TCP connections, respective single-TCP-connection MSEs, each of which would result from fitting a respective single-TCP-connection line to those of the two-dimensional coordinates that represent those of the packets belonging to a respective one of the TCP connections, and
wherein the instructions cause the processor to calculate the threshold MSE as a function of those of the single-TCP-connection MSEs that belong to the tentatively-augmented TCP-connection subset.

18. The computer software product according to claim 17, wherein the instructions cause the processor to calculate the threshold MSE by:
calculating an average of those of the single-TCP-connection MSEs that belong to the tentatively-augmented TCP-connection subset, and
multiplying the average by a predetermined factor.

19. The computer software product according to claim 18, wherein the average is a weighted average, and
wherein the instructions further cause the processor to, prior to calculating the weighted average, weight each of those of the single-TCP-connection MSEs that belong to the tentatively-augmented TCP-connection subset by a number of the packets that belong to the TCP connection to which the single-TCP-connection MSE corresponds.

20. The computer software product according to claim 15, wherein the instructions further cause the processor to, in response to the output, associate first information contained in a first one of the TCP connections with second information contained in a second one of the TCP connections that belongs to the same TCP-connection subset as the first one of the TCP connections.

* * * * *